(12) United States Patent
Cheng et al.

(10) Patent No.: US 12,300,850 B2
(45) Date of Patent: *May 13, 2025

(54) SEPARATOR, SECONDARY BATTERY COMPRISING SAME AND RELATED BATTERY MODULE, BATTERY PACK AND DEVICE

(71) Applicant: CONTEMPORARY AMPEREX TECHNOLOGY (HONG KONG) LIMITED, Hong Kong (CN)

(72) Inventors: Cong Cheng, Ningde (CN); Haiyi Hong, Ningde (CN); Jianrui Yang, Ningde (CN); Yuanyuan Lan, Ningde (CN); Na Liu, Ningde (CN); Haizu Jin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/942,029

(22) Filed: Sep. 9, 2022

(65) Prior Publication Data
US 2023/0015490 A1     Jan. 19, 2023

Related U.S. Application Data

(63) Continuation of application No. PCT/CN2020/132951, filed on Nov. 30, 2020.

(51) Int. Cl.
*H01M 50/44*     (2021.01)
*H01M 50/403*     (2021.01)
(Continued)

(52) U.S. Cl.
CPC ....... *H01M 50/446* (2021.01); *H01M 50/403* (2021.01); *H01M 50/449* (2021.01); *H01M 50/494* (2021.01)

(58) Field of Classification Search
None
See application file for complete search history.

(56) References Cited

U.S. PATENT DOCUMENTS 9,758,629 B2    9/2017   Katsuda et al.
9,825,270 B2   11/2017   Katsuda et al.
(Continued)

FOREIGN PATENT DOCUMENTS

CN     102630353 A     8/2012
CN     103441230 A    12/2013
(Continued)

OTHER PUBLICATIONS

Contemporary Amperex Technology Co., Limited, International Search Report and Written Opinion, PCTCN2020132951, Sep. 1, 2021, 17 pgs.
(Continued)

*Primary Examiner* — Jonathan G Leong
*Assistant Examiner* — Tony S Chuo
(74) *Attorney, Agent, or Firm* — K&L Gates LLP

(57) ABSTRACT

The present application relates to a separator, comprising a substrate and a coating formed on at least one surface of the substrate, wherein the coating comprises inorganic particles and first organic particles embedded in the inorganic particles and forming protrusions on the surface of the coating, and the first organic particles have a primary particle morphology and a number-average particle size of ≥2 μm. The present application also relates to a secondary battery comprising the separator, a device comprising the secondary battery and a method for preparing the separator.

20 Claims, 5 Drawing Sheets

(51) Int. Cl.
  *H01M 50/446* (2021.01)
  *H01M 50/449* (2021.01)
  *H01M 50/494* (2021.01)

(56) References Cited

U.S. PATENT DOCUMENTS

| | | | |
|---|---|---|---|
| 11,814,483 B2 | 11/2023 | Jeon et al. | |
| 2006/0019153 A1* | 1/2006 | Imachi | H01M 4/366 |
| | | | 429/231.1 |
| 2006/0019154 A1 | 1/2006 | Imachi et al. | |
| 2010/0196750 A1* | 8/2010 | Kajita | H01M 50/423 |
| | | | 429/145 |
| 2011/0311870 A1* | 12/2011 | Wakizaka | H01M 4/62 |
| | | | 429/232 |
| 2012/0107690 A1 | 5/2012 | Wakizaka et al. | |
| 2012/0189897 A1 | 7/2012 | Wakizaka et al. | |
| 2013/0017431 A1 | 1/2013 | Frisk et al. | |
| 2013/0244116 A1* | 9/2013 | Watanabe | H01M 10/4235 |
| | | | 429/211 |
| 2014/0255796 A1 | 9/2014 | Matsuoka et al. | |
| 2015/0140402 A1* | 5/2015 | Kim | H01M 50/461 |
| | | | 429/144 |
| 2015/0140403 A1 | 5/2015 | Moon et al. | |
| 2015/0188108 A1 | 7/2015 | Miyazawa et al. | |
| 2015/0240039 A1 | 8/2015 | Katsuda et al. | |
| 2015/0280197 A1* | 10/2015 | Zhao | H01M 50/446 |
| | | | 429/144 |
| 2016/0141575 A1* | 5/2016 | Sasaki | B32B 27/00 |
| | | | 429/246 |
| 2017/0149040 A1* | 5/2017 | Suzuki | H01M 50/457 |
| 2017/0288192 A1 | 10/2017 | Chen et al. | |
| 2019/0198840 A1 | 6/2019 | Huang et al. | |
| 2019/0280274 A1 | 9/2019 | Kim et al. | |
| 2021/0005858 A1 | 1/2021 | Kim et al. | |
| 2021/0184311 A1 | 6/2021 | Lefebvre et al. | |
| 2021/0320379 A1* | 10/2021 | Kwon | H01M 50/457 |
| 2022/0123433 A1 | 4/2022 | Taguchi et al. | |
| 2022/0285722 A1 | 9/2022 | Sung et al. | |

FOREIGN PATENT DOCUMENTS

| | | | |
|---|---|---|---|
| CN | 103515564 A | 1/2014 | |
| CN | 103904276 A | 7/2014 | |
| CN | 104064707 A | 9/2014 | |
| CN | 104659311 A | 5/2015 | |
| CN | 105958000 A | 9/2016 | |
| CN | 107895765 A | 4/2018 | |
| CN | 109037555 A | 12/2018 | |
| CN | 109148798 A | 1/2019 | |
| CN | 109950451 A | 6/2019 | |
| CN | 109980164 A | 7/2019 | |
| CN | 110233223 A | 9/2019 | |
| CN | 111192999 A | 5/2020 | |
| CN | 111244365 A | 6/2020 | |
| CN | 111492507 A | 8/2020 | |
| CN | 111554860 A | 8/2020 | |
| CN | 111653717 A | 9/2020 | |
| CN | 111668427 A | 9/2020 | |
| CN | 111682149 A | 9/2020 | |
| CN | 111954943 A | 11/2020 | |
| CN | 109148798 B | 6/2021 | |
| CN | 113363672 A | 9/2021 | |
| CN | 117397109 A | 1/2024 | |
| EP | 2485295 A1 | 8/2012 | |
| EP | 3704749 A1 | 9/2020 | |
| EP | 3933864 A1 | 1/2022 | |
| JP | 2010-238448 A | 10/2010 | |
| JP | 2013-008481 A | 1/2013 | |
| JP | 2018050833 A | 4/2018 | |
| JP | 2018053043 A | 4/2018 | |
| JP | 2018147578 A | 9/2018 | |
| JP | 2019133934 A | 8/2019 | |
| JP | 2019160792 A | 9/2019 | |
| JP | 2022552622 A | 12/2022 | |
| KR | 10-2012-0091028 A | 8/2012 | |
| KR | 20130099592 A | 9/2013 | |
| KR | 20140037660 A | 3/2014 | |
| KR | 10-2014-0125352 A | 10/2014 | |
| KR | 10-2015-0020667 A | 2/2015 | |
| KR | 20150040239 A | 4/2015 | |
| KR | 10-2015-0131005 A | 11/2015 | |
| KR | 10-2016-0118979 A | 10/2016 | |
| KR | 10-2017-0102876 A | 9/2017 | |
| KR | 101838337 B1 | 3/2018 | |
| KR | 10-2019-0102572 A | 9/2019 | |
| KR | 1020200045790 A | 5/2020 | |
| KR | 10-2020-0081442 A | 7/2020 | |
| KR | 10-2181313 B1 | 11/2020 | |
| KR | 102582604 B | 9/2023 | |
| WO | WO2011040562 A1 | 4/2011 | |
| WO | WO2013080946 A1 | 6/2013 | |
| WO | 2016017066 A1 | 2/2016 | |
| WO | WO2018034094 A1 | 2/2018 | |
| WO | WO 2019/089492 A1 * | 5/2019 | H01M 2/16 |
| WO | WO2019164130 A1 | 8/2019 | |
| WO | 2019192475 A1 | 10/2019 | |
| WO | 2019242016 A1 | 12/2019 | |
| WO | WO2020142702 A1 | 7/2020 | |
| WO | WO2020175079 A1 | 9/2020 | |
| WO | WO2020175292 A1 | 9/2020 | |
| WO | 2020195988 A1 | 10/2020 | |

OTHER PUBLICATIONS

Contemporary Amperex Technology Co., Limited, Extended European Search Report, EP20963111.8, May 3, 2023, 12 pgs.
Contemporary Amperex Technology Co., Limited, Notice of the First Office Action, CN202080083061.2, May 8, 2023, 17 pgs.
Baldwin, Battery Separator Characterization and Evaluation Procedures for NASA's Advanced Lithium-Ion Batteries, NASA/TM-2010-216099, May 1, 2010 (May 1, 2010), 70 pgs.
Mettler Toledo, Selected Applications, Application Handbook Thermal Analysis of Polymers Selected Applications Thermal Analysis, Jan. 1, 2013 (Jan. 1, 2013), 40 pgs.
Penella, A Survey of Methods for the Evaluation of Tissue Engineering Scaffold Permeability, Annals of Biomedical Engineering, vol. 41, No. 10, Apr. 24, 2013 (Apr. 24, 2013), pp. 2027-2041, 15 pgs.
Office Action issued Aug. 7, 2023 in Japanese Patent Application No. 2022-552622, 11 pages.
Third Party Observations mailed Feb. 8, 2024 in European Patent Application No. 20963111.8.
Transmittal of Notice of Cancellation issued Dec. 4, 2023 in Korean Patent No. 2536847 with English translation thereof.
Cancellation of utility model registration received in the corresponding Korean Patent No. 2582604, mailed Feb. 26, 2024.
Cancellation of utility model registration received in the corresponding Korean Patent No. 2537203, mailed Nov. 23, 2023.
Third Party Submission received in the corresponding European Application 20963115.9, mailed Feb. 16, 2024.
Notice of Reasons for Refusal received in the corresponding Japanese Application No. 2024-034011, mailed on Oct. 21, 2024.
Notice of Reasons for-Refusal, JP-2022-552622, Feb. 28, 2023, 18 pgs.
Notice of Preliminary Rejection, KR10-2022-7030299, Dec. 22, 2022, 16 pgs.
First Office Action received in the counterpart Chinese application 202080103010.1, mailed on Jun. 4, 2024.
The Non-final Office Action received in the counterpart U.S. Appl. No. 17/864,297, mailed on Sep. 12, 2023.
The international search report received in the counterpart international application PCT/CN2020/132952, mailed on Jun. 24, 2021.
The written opinion of ISA received in the counterpart international application PCT/CN2020/132952, mailed on Jun. 24, 2021.
The extended European search report received in the counterpart European application 20963112.6, mailed on Oct. 11, 2024.
First Office Action received in the counterpart Chinese application 202080095489.9, mailed on May 9, 2023.

(56) References Cited

OTHER PUBLICATIONS

Grant Notice received in the counterpart Chinese application 202080095489.9, mailed on Jan. 2, 2024.
The extended European search report received in the counterpart European application 20963115.9, mailed on May 3, 2023.
The Non-final Office Action received in the counterpart U.S. Appl. No. 17/950,978, mailed on Feb. 28, 2023.
The Final Office Action received in the counterpart U.S. Appl. No. 17/950,978, mailed on Jun. 7, 2023.
The extended European search report received in the counterpart European application 20963110.0, mailed on May 3, 2023.
Notice of Reasons for Refusal received in the counterpart Japanese application 2022-553658, mailed on Mar. 20, 2023.
The Final Office Action received in the counterpart U.S. Appl. No. 17/942,031, mailed on May 1, 2024.
The international search report received in the counterpart international application PCT/CN2020/132950, mailed on Aug. 26, 2021.
The written opinion of ISA received in the counterpart international application PCT/CN2020/132950, mailed on Aug. 26, 2021.

* cited by examiner

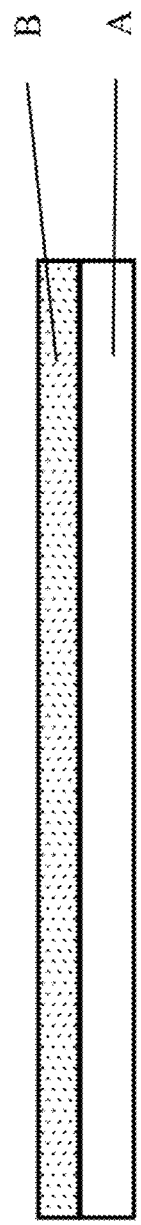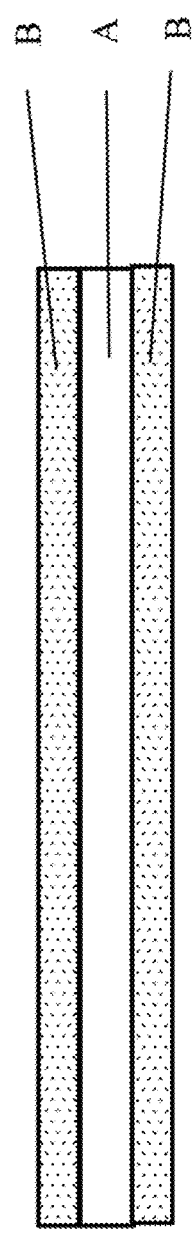
Fig. 4-1
Fig. 4-2

SEPARATOR, SECONDARY BATTERY COMPRISING SAME AND RELATED BATTERY MODULE, BATTERY PACK AND DEVICE

CROSS-REFERENCE TO RELATED APPLICATION

This application is a continuation application of PCT Patent Application No. PCT/CN2020/132951, entitled "SEPARATOR FILM, SECONDARY BATTERY CONTAINING SAME, RELATED BATTERY MODULE THEREOF, BATTERY PACK AND DEVICE" filed on Nov. 30, 2020, which is incorporated herein by reference in its entirety.

This application is related to U.S. patent application Ser. No. 17/950,978, entitled "SEPARATOR, PREPARATION METHOD THEREFOR AND RELATED SECONDARY BATTERY, BATTERY MODULE, BATTERY PACK AND DEVICE" filed on Sep. 22, 2022, which is incorporated herein by reference in its entirety.

This application is related to U.S. patent application Ser. No. 17/942,031, entitled "SEPARATOR, PREPARATION METHOD THEREFOR AND RELATED SECONDARY BATTERY, BATTERY MODULE, BATTERY PACK AND DEVICE" filed on Sep. 9, 2022, which is incorporated herein by reference in its entirety.

This application is related to U.S. patent application Ser. No. 17/940,913, entitled "SEPARATOR, PREPARATION METHOD THEREFOR AND RELATED SECONDARY BATTERY, BATTERY MODULE, BATTERY PACK AND DEVICE" filed on Sep. 8, 2022, which is incorporated herein by reference in its entirety.

TECHNICAL FIELD

The present application belongs to the technical field of secondary batteries, and in particular relates to a separator, a secondary battery comprising same and a related battery module, battery pack and device.

BACKGROUND ART

Secondary batteries are widely used in various consumer electronic products and electric vehicles due to their outstanding features, such as a light weight, no pollution and no memory effect.

With the continuous development in the new energy industry, higher requirements for the use of secondary batteries have been proposed by costumers. For example, the energy density of secondary batteries is designed to be higher and higher; however, the increase of the energy density of the battery is often detrimental to balancing dynamic performance, electrochemical performance, or safety performance, etc.

Therefore, it is a key challenge in the field of battery design to create batteries with both high cycling performance and high safety performance.

SUMMARY OF THE INVENTION

In view of the technical problems mentioned in the background art, the present application provides a separator, which aims to enable a secondary battery comprising the separator to have good cycling performance and safety performance.

In order to achieve the above object, in a first aspect, the present application provides a separator, comprising: a substrate and a coating formed on at least one surface of the substrate, wherein the coating comprises inorganic particles and first organic particles embedded in the inorganic particles and forming protrusions on the surface of the coating; and the first organic particles have a primary particle morphology and a number-average particle size of $\geq 2$ μm.

Compared with the prior art, the present application comprises at least the following beneficial effects:

the separator of the present application comprises inorganic particles and first organic particles in the same coating, which greatly reduces the overall thickness of the separator, thereby improving the energy density of the battery; in addition, a special design is made in terms of the morphology and number-average particle size of the first organic particles, such that sufficient and non-uniformly distributed voids are formed between the inorganic particles and the organic particles, which can not only ensure the good air permeability of the separator, but also improve the bonding between the separator and the electrode plate, thereby allowing the secondary battery to have better cycling performance and safety performance. The device of the present application comprises the secondary battery provided by the present application, and thus has at least the same advantages as the secondary battery.

In any embodiment of the present application, the first organic particles have a number-average particle size of 2 μm–10 μm; in some embodiments, the first organic particles have a number-average particle size of 3 μm–8 μm. When the number-average particle size of the first organic particles is within the given range, the cycling performance and safety performance of the battery can be further improved.

In any embodiment of the present application, the first organic particles comprise one or more of a homopolymer or copolymer of an acrylate monomeric unit, a homopolymer or copolymer of an acrylic monomeric unit, a homopolymer or copolymer of a styrene monomeric unit, a polyurethane compound, a rubber compound, and modified compounds of these homopolymers or copolymers.

In any embodiment of the present application, the first organic particles comprise one or more of a copolymer of an acrylate monomeric unit and a styrene monomeric unit, a copolymer of an acrylic monomeric unit and a styrene monomeric unit, a copolymer of an acrylic monomeric unit, an acrylate monomeric unit and a styrene monomeric unit, a copolymer of a styrene monomeric unit and an unsaturated nitrile monomeric unit, a copolymer of a styrene monomeric unit, an olefine monomeric unit and an unsaturated nitrile monomeric unit, and modified compounds of these copolymers.

In any embodiment of the present application, the first organic particles comprise one or more of a butyl acrylate-styrene copolymer, a butyl methacrylate-isooctyl methacrylate copolymer, an isooctyl methacrylate-styrene copolymer, a methacrylate-methacrylic acid-styrene copolymer, a methyl acrylate-isooctyl methacrylate-styrene copolymer, a butyl acrylate-isooctyl acrylate-styrene copolymer, a butyl acrylate-isooctyl methacrylate-styrene copolymer, a butyl methacrylate-isooctyl methacrylate-styrene copolymer, a butyl methacrylate-isooctyl acrylate-styrene copolymer, a styrene-acrylonitrile copolymer, a styrene-butadiene-acrylonitrile copolymer, a methyl acrylate-styrene-acrylonitrile copolymer, an isooctyl methacrylate-styrene-acrylonitrile copolymer, a styrene-vinyl acetate copolymer, a styrene-vinyl acetate-pyrrolidone copolymer, and modified compounds of these copolymers.

In any embodiment of the present application, at least part of the first organic particles comprise a core structure and a shell structure. When at least part of the first organic particles have a core structure and a shell structure, the cycling performance and safety performance of the battery can be further improved.

In any embodiment of the present application, the shell structure has a glass transition temperature higher than that of the core structure.

In any embodiment of the present application, the core structure has a glass transition temperature of −30° C. to 20° C., in some embodiments −10° C. to 10° C.

In any embodiment of the present application, the shell structure has a glass transition temperature of 50° C. to 70° C., in some embodiments 55° C. to 65° C.

When the glass transition temperatures of the shell structure and core structure satisfy the above conditions, the cycling performance and safety performance of the battery can be further improved.

In any embodiment of the present application, the core structure and the shell structure both comprise a copolymer of an acrylate monomeric unit.

In any embodiment of the present application, the core structure and the shell structure in the first organic particles both comprise a copolymer of an acrylate monomeric unit and a styrene monomeric unit.

When the core structure and the shell structure in the second organic particles both comprise the copolymer described above, the cycling performance of the battery can be further improved.

In any embodiment of the present application, the mass percentage of the first organic particles in the coating is ≥10%, in some embodiments 10%-30%. When the content of the first organic particles is within the given range, the cycling performance and safety performance of the battery can be further improved.

In any embodiment of the present application, the coating can further comprise second organic particles embedded in the inorganic particles and forming protrusions on the surface of the coating, and the second organic particles have a secondary particle morphology. When the coating comprises the second organic particles in the described form, the cycling performance and safety performance of the battery can be further improved.

In any embodiment of the present application, the second organic particles have a number-average particle size of ≥12 µm; in some embodiments, the second organic particles have a number-average particle size of 15 µm–25 µm. When the number-average particle size of the second organic particles is within the given range, the cycling performance and safety performance of the battery can be further improved.

In any embodiment of the present application, the mass percentage of the second organic particles in the coating is less than or equal to that of the first organic particles in the coating; in some embodiments, the mass percentage of the second organic particles in the coating is 1%-10%, further in some embodiments 2%-8%. When the mass percentages of the second organic particles and the first organic particles satisfy the conditions, the cycling performance of the battery can be further improved.

In any embodiment of the present application, the second organic particles comprise one or more of a homopolymer or copolymer of a fluorine-containing olefine monomeric unit, a homopolymer or copolymer of an olefine monomeric unit, a homopolymer or copolymer of an unsaturated nitrile monomeric unit, a homopolymer or copolymer of an alkylene oxide monomeric unit, and modified compounds of these homopolymers or copolymers;

In any embodiment of the present application, the second organic particles comprise one or more of polytetrafluoroethylene, polychlorotrifluoroethylene, polyvinyl fluoride, polyvinylidene fluoride, polyethylene, polypropylene, polyacrylonitrile, polyethylene oxide, a copolymer of different fluorine-containing olefine monomeric units, a copolymer of a fluorine-containing olefine monomeric unit and an ethylene monomeric unit, a copolymer of a fluorine-containing olefine monomeric unit and an acrylic monomeric unit, a copolymer of a fluorine-containing olefine monomeric unit and an acrylate monomeric unit, and modified compounds of these homopolymers or copolymers.

In any embodiment of the present application, the second organic particles comprise one or more of a vinylidene fluoride-trifluoroethylene copolymer, a vinylidene fluoride-hexafluoropropylene copolymer, a vinylidene fluoride-trifluoroethylene-hexafluoropropylene copolymer, a vinylidene fluoride-hexafluoropropylene-acrylic acid copolymer, a vinylidene fluoride-hexafluoropropylene-acrylate copolymer, and modified compounds of these copolymers.

In any embodiment of the present application, the inorganic particles can comprise one or more of boehmite (γ-A100H), aluminum oxide ($Al_2O_3$), barium sulfate ($BaSO_4$), magnesium oxide (MgO), magnesium hydroxide ($Mg(OH)_2$), silicon dioxide ($SiO_2$), tin dioxide ($SnO_2$), titanium oxide ($TiO_2$), calcium oxide (CaO), zinc oxide (ZnO), zirconium oxide ($ZrO_2$), yttrium oxide ($Y_2O_3$), nickel oxide (NiO), cerium oxide ($CeO_2$), zirconium titanate ($SrTiO_3$), barium titanate ($BaTiO_3$), and magnesium fluoride ($MgF_2$).

In any embodiment of the present application, the inorganic particles have a particle size≤2.5 µm; in some embodiments, the inorganic particles have a particle size of 0.5 µm–2.5 µm. When the particle size of the inorganic particles is within the given range, the cycling performance and safety performance of the battery can be further improved.

In any embodiment of the present application, the separator has a single-sided coating weight per unit area of ≤3.0 g/m$^2$; in some embodiments, the separator has a single-sided coating weight per unit area of 1.5 g/m$^2$-2.5 g/m$^2$. When the coating weight satisfies the range, the cycling performance and safety performance of the battery can be further improved.

In any embodiment of the present application, the separator can have an air permeability of 100 s/100 mL-300 s/100 mL; in some embodiments, the separator can have an air permeability of 150 s/100 mL-250 s/100 mL.

In any embodiment of the present application, the separator can have a transverse tensile strength (Transverse Direction, TD) of 1000 kg/cm$^2$–3500 kg/cm$^2$; in some embodiments, the separator can have a transverse tensile strength of 1200 kg/cm$^2$–3000 kg/cm$^2$.

In any embodiment of the present application, the separator can have a longitudinal tensile strength (Machine Direction, MD) of 1000 kg/cm$^2$–3000 kg/cm$^2$; in some embodiments, the separator can have a longitudinal tensile strength of 1000 kg/cm$^2$–2800 kg/cm$^2$.

In any embodiment of the present application, the separator can have a transverse elongation at break of 50%-200%; in some embodiments, the separator can have a transverse elongation at break of 80%-150%.

In any embodiment of the present application, the separator can have a longitudinal elongation at break of 50%-200%; in some embodiments, the separator can have a longitudinal elongation at break of 80%-150%.

In any embodiment of the present application, the inorganic particles and the organic particles form a non-uniform pore structure in the coating.

In any embodiment of the present application, the spacing between any two adjacent inorganic particles is denoted as L1, and the spacing between any inorganic particle and an adjacent organic particle is denoted as L2, wherein L1≤L2.

In a second aspect, the present application provides a method for preparing a separator, comprising the following steps:

(1) providing a substrate;

(2) providing a coating slurry, comprising a component material and a solvent, wherein the component material comprises inorganic particles and organic particles, and the organic particles comprise first organic particles; and (3) coating at least one side of the substrate from step (1) with the coating slurry from step (2) so as to form a coating, and drying same to obtain the separator; wherein the separator comprises: a substrate; and a coating formed on at least one surface of the substrate; the coating comprises inorganic particles and first organic particles embedded in the inorganic particles and forming protrusions on the surface of the coating, and the first organic particles have a primary particle morphology and a number-average particle size of ≥2 μm.

In any embodiment of the present application, in step (2), the first organic particles are added in a mass percentage of 10% or more of the total dry weight of the component material; in some embodiments 10%-30%.

In any embodiment of the present application, in step (2), the organic particles further comprise second organic particles, and the second organic particles have a secondary particle morphology.

In any embodiment of the present application, in step (2), the second organic particles are added in a mass less than or equal to the mass of the first organic particles that are added.

In any embodiment of the present application, in step (2), the second organic particles are added in a mass percentage of 1%-10% of the total dry weight of the component material, further in some embodiments 2%-8%.

In any embodiment of the present application, in step (2), the coating slurry has a solid content of 28%-45%, in some embodiments 30%-38%, based on the weight of the coating slurry.

In any embodiment of the present application, in step (3), the coating is carried out by using a coating machine, wherein the coating machine comprises a gravure roller which has a number of lines of 100 LPI-300 LPI, in some embodiments 125 LPI-190 LPI.

In any embodiment of the present application, in step (3), the coating is carried out at a speed of 30 m/min-90 m/min, in some embodiments 50 m/min-70 m/min.

In any embodiment of the present application, in step (3), the coating is carried out at a line speed ratio of 0.8-2.5, in some embodiments 0.8-1.5.

In any embodiment of the present application, in step (3), the drying is carried out at a temperature of 40° C. to 70° C., in some embodiments 50° C. to 60° C.

In any embodiment of the present application, in step (3), the drying is carried out for a period of 10 s-120 s, in some embodiments 20 s-80 s. In a third aspect, the present application provides a secondary battery, comprising a separator according to the first aspect of the present application or a separator prepared by the method according to the second aspect of the present application.

In a fourth aspect, the present application provides a battery module, comprising a secondary battery according to the third aspect of the present application.

In a fifth aspect, the present application provides a battery pack, comprising a battery module according to the fourth aspect of the present application.

In a sixth aspect, the present application provides a device, comprising at least one of a secondary battery according to the third aspect of the present application, a battery module according to the fourth aspect of the present application, or a battery pack according to the fifth aspect of the present application.

BRIEF DESCRIPTION OF THE DRAWINGS

In order to illustrate the technical solutions of the present application more clearly, the drawings used in the present application will be described briefly below. Apparently, the drawings described below are merely some embodiments of the present application, and those of ordinary skill in the art may derive other drawings from these drawings without creative efforts.

FIG. 1-2 is a structural schematic diagram of a coating in a further embodiment of a separator of the present application.

FIG. 2-1 is an ion-polished cross-sectional topography (cross-section polishing, CP) picture in an embodiment of a separator of the present application.

FIG. 2-2 is an ion-polished cross-sectional topography (CP) picture in a further embodiment of a separator of the present application.

FIG. 3-1 is a scanning electron microscope (SEM) picture in an embodiment of a separator of the present application.

FIG. 3-2 is a scanning electron microscope (SEM) picture in a further embodiment of a separator of the present application.

FIG. 4-1 is a structural schematic diagram of an embodiment of a separator of the present application.

FIG. 4-2 is a structural schematic diagram of a further embodiment of a separator of the present application.

DETAILED DESCRIPTION OF EMBODIMENTS

Figure 1:
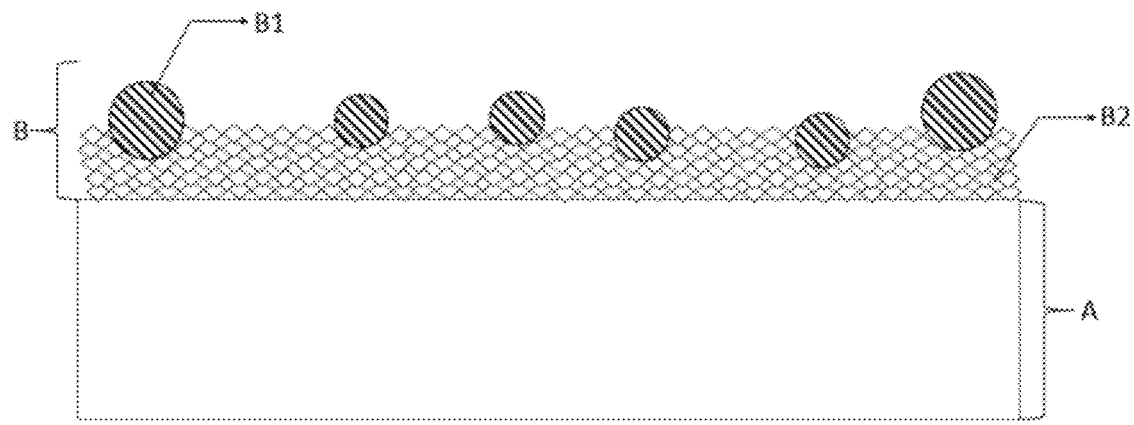
FIG. 1-1 is a structural schematic diagram of a coating in an embodiment of a separator of the present application.

The present application will be further described below in conjunction with specific embodiments. It should be understood that these specific embodiments are merely intended to illustrate the present application but not to limit the scope of the present application.

For the sake of brevity, only certain numerical ranges are specifically disclosed herein. However, any lower limit may be combined with any upper limit to form a range that is not explicitly described; and any lower limit may be combined with any other lower limit to form an unspecified range, and any upper limit likewise may be combined with any other upper limit to form an unspecified range. Furthermore, each individually disclosed point or single value itself may serve as a lower or upper limit in combination with any other point or single value or with other lower or upper limit to form an unspecified range.

In the description herein, it should be noted that, unless otherwise stated, the recitation of numerical ranges by "no less than" and "no more than" include all numbers within that range including the endpoints, the recitation of "more" in the phrase "one or more" comprises two or more.

In the description herein, unless otherwise stated, the term "or" is inclusive. That is to say, the phrase "A or B" means "A, B, or both A and B." More specifically, a condition "A or B" is satisfied by any one of the following: A is true (or present) and B is false (or not present); A is false (or not present) and B is true (or present); or both A and B are true (or present). Unless otherwise stated, the terms used in the present application have the meaning well-known to a person of ordinary skill in the art. Unless otherwise stated, the values of the parameters mentioned in the present application may be measured by various measurement methods commonly used in the art (for example, may be measured according to the method illustrated in the examples of the present application).

Secondary Battery

A secondary battery, refers to a battery which can continue to be used by activating the active material by means of charging after the battery is discharged.

Generally, the secondary battery comprises a positive electrode plate, a negative electrode plate, a separator and an electrolyte. During the charge/discharge process of the battery, active ions are intercalated and de-intercalated back and forth between the positive electrode plate and the negative electrode plate. The separator is provided between the positive electrode plate and the negative electrode plate, and functions for separation. The electrolyte is located between the positive electrode plate and the negative electrode plate and functions for ionic conduction.

[Separator]

The separator provided in the present application comprises: a substrate and a coating formed on at least one surface of the substrate, wherein the coating comprises inorganic particles and organic particles; the organic particles comprise first organic particles embedded in the inorganic particles and forming protrusions on the surface of the coating; and the first organic particles have a primary particle morphology and a number-average particle size of ≥2 μm.

It should be noted that the primary particles have a meaning well-known in the art. The primary particles refer to particles that do not form an agglomerated state.

The number-average particle size of the organic particles refers to the average particle size of the organic particles counted according to the number of the organic particles in the coating of the separator. The particle size of the organic particle refers to the distance between two points on the organic particles that are farthest apart.

As shown in FIG. 1-1, the separator comprises a substrate (A) and a coating (B), wherein the coating (B) comprises first organic particles (B1) and inorganic particles (B2), the first organic particles (B1) are primary particles, and are embedded in the inorganic particles (B2) and form protrusions on the surface of the coating (B).

Without wishing to be bound by any theory, the separator of the present application comprises inorganic particles and first organic particles in the same coating, which greatly reduces the overall thickness of the separator, compared to a separator comprising two coatings, i.e., an inorganic particles layer and an organic particles layer; moreover, the first organic particles are specially designed, and with a combination of the two aspects, the battery can have good cycling performance and safety performance at the same time. Meanwhile, since the first organic particles having a primary particle morphology have a smaller specific gravity, the first organic particles can float on the surface of the coating more easily during the preparation of the separator; when the separator is used in a battery, the first organic particles effectively improve the bonding force between the separator and the electrode plate, such that electrode plate does not easily wrinkle during the charge/discharge process of the battery, thus improving the cycling performance of the battery; on the other hand, when the battery is in a normal working environment (for example, no more than 60° C.), the first organic particles specially designed in the present application have a low swelling ratio in the electrolyte, which can effectively reduce the probability of forming a dense and large-area adhesive film structure, and ensures that the separator has a moderate and non-uniform pore structure, facilitating the ion transmission, and thereby further improving the cycling performance of the battery; especially, when the battery is in a high-temperature working environment (for example, 100° C. or more), the first organic particles specially designed in the present application will form a dense and large-area adhesive film structure at a high temperature, which will quickly reduce the ion diffusion channels and delay the thermal propagation time of the battery, thereby effectively improving the safety performance of the battery.

By the intensive study, the present inventors have found that on the basis that the separator of the present application satisfies the design conditions, if one or more of the following conditions are also satisfied, the performance of the secondary battery can be further improved.

In some embodiments, the first organic particles have a number-average particle size of 2 μm–12 μm; for example, the first organic particles can have a number-average particle size of 2 μm-10 μm, 2.5 μm-10 μm, 2.8 μm-10 μm, 3 μm-8 μm, 2.5 μm-6 μm, 4 μm-8 μm, etc. When the number-average particle size of the first organic particles is within the given range, they have a suitable swelling ratio in the electrolyte, which can ensure the unblocked ion transmission channel during the normal operation of the battery; furthermore, a suitable particle size range also can avoid the poor electrolyte infiltration caused by the too strong bonding between the separator and the electrode plate, thereby further improving the cycling performance of the battery.

In some embodiments, the first organic particles can comprise one or more of a homopolymer or copolymer of an acrylate monomeric unit, a homopolymer or copolymer of an acrylic monomeric unit, a homopolymer or copolymer of a styrene monomeric unit, a polyurethane compound, a rubber compound, and modified compounds of these homopolymers or copolymers.

In some embodiments, the first organic particles can comprise one or more of a copolymer of an acrylate monomeric unit and a styrene monomeric unit, a copolymer of an acrylic monomeric unit and a styrene monomeric unit, a copolymer of an acrylic monomeric unit, an acrylate monomeric unit and a styrene monomeric unit, a copolymer of a styrene monomeric unit and an unsaturated nitrile monomeric unit, a copolymer of a styrene monomeric unit, an olefine monomeric unit and an unsaturated nitrile monomeric unit, and modified compounds of these materials.

In some embodiments, the acrylate monomeric unit can be selected from one or more of methyl acrylate, ethyl acrylate, propyl acrylate, butyl acrylate, methyl methacrylate, butyl methacrylate, isooctyl methacrylate, etc.

In some embodiments, the acrylic monomeric unit can be selected from one or more of acrylic acid, methacrylic acid, etc.

In some embodiments, the styrene monomeric unit can be selected from one or more of styrene, methylstyrene, etc.

In some embodiments, the unsaturated nitrile monomeric unit can be selected from one or more of acrylonitrile, methylacrylonitrile, etc.

In some embodiments, the first organic particles can comprise one or more of a butyl acrylate-styrene copolymer, a butyl methacrylate-isooctyl methacrylate copolymer, an isooctyl methacrylate-styrene copolymer, a methacrylate-methacrylic acid-styrene copolymer, a methyl acrylate-isooctyl methacrylate-styrene copolymer, a butyl acrylate-isooctyl acrylate-styrene copolymer, a butyl acrylate-isooctyl methacrylate-styrene copolymer, a butyl methacrylate-isooctyl methacrylate-styrene copolymer, a butyl methacrylate-isooctyl acrylate-styrene copolymer, a styrene-acrylonitrile copolymer, a styrene-butadiene-acrylonitrile copolymer, a methyl acrylate-styrene-acrylonitrile copolymer, an isooctyl methacrylate-styrene-acrylonitrile copolymer, a styrene-vinyl acetate copolymer, a styrene-vinyl acetate-pyrrolidone copolymer, and modified compounds of these materials.

In the present application, a modified compound of the homopolymer or copolymer refers to a modified compound obtained by copolymerization of the monomeric units in the homopolymer or copolymer with monomeric units containing a specific functional group. For example, a fluorine-containing olefine monomeric unit can be copolymerized with a carboxyl functional group-containing compound to obtain a modified compound thereof, etc.

In some embodiments, at least part of the first organic particles comprise a core structure and a shell structure.

In some embodiments, the core structure and the shell structure comprise the same copolymer of a monomeric unit. By adjusting the copolymerization ratio of the monomeric units or the polymerization process, the glass transition temperatures of the core structure and shell structure materials can be adjusted.

In some embodiments, the shell structure has a glass transition temperature higher than that of the core structure. Since the shell structure has a higher glass transition temperature, the probability of fusion between organic particles to form a continuous adhesive film during the production process of the separator can be effectively reduced, thus improving the ion transmission channel of the separator; in addition, a good ability of bonding the electrode plate in the electrolyte can be maintained, such that the electrode plates are better adhered onto the separator, thus facilitating a further improvement of the cycling performance of the battery.

In some embodiments, the core structure can have a glass transition temperature of −30° C. to 20° C., for example, −10° C. to 10° C.

In some embodiments, the shell structure can have a glass transition temperature of 50° C. to 70° C., for example, 55° C. to 65° C.

In some embodiments, the core structure and the shell structure both comprise a copolymer of an acrylate monomeric unit, for example a copolymer of an acrylate monomeric unit and a styrene monomeric unit, which is helpful to reduce the swelling ratio of the first organic particles in the electrolyte during the normal temperature operation, and further reduce the probability of forming a large-area adhesive film structure, thereby further improving the cycling performance of the battery.

In some embodiments, the mass percentage of the first organic particles in the coating is ≥10% (based on the total mass of the coating); for example, the mass percentage of the first organic particles in the coating can be 10%-30%, 15%-30%, 10%-25%, and 10%-20%. When the mass percentage of the first organic particles is controlled within the given range, it is helpful for the coating of the separator to have a good pore structure while ensuring a bonding property, thereby further improving the cycling performance and safety performance of the battery.

In some embodiments, the inorganic particles can comprise one or more of boehmite (γ-A100H), aluminum oxide ($Al_2O_3$), barium sulfate ($BaSO_4$), magnesium oxide (MgO), magnesium hydroxide ($Mg(OH)_2$), silicon dioxide ($SiO_2$), tin dioxide ($SnO_2$), titanium oxide ($TiO_2$), calcium oxide (CaO), zinc oxide (ZnO), zirconium oxide ($ZrO_2$), yttrium oxide ($Y_2O_3$), nickel oxide (NiO), cerium oxide ($CeO_2$), zirconium titanate ($SrTiO_3$), barium titanate ($BaTiO_3$), and magnesium fluoride ($MgF_2$); for example, the inorganic particles can comprise one or more of boehmite (γ-A100H), and aluminum oxide ($Al_2O_3$).

In some embodiments, the inorganic particles have a volume-average particle size $Dv_{50}$ of ≤2.5 μm; for example, the inorganic particles can have a volume-average particle size of 0.5 μm-2 μm, 1.5 μm-2.5 μm, 0.3 μm-0.7 μm, etc. When the particle size of the inorganic particles is controlled within the given range, it is helpful to improve the infiltration of the electrolyte in the separator, thereby further improving the cycling performance of the battery.

In some embodiments, the mass percentage of the inorganic particles in the coating is ≤90%, based on the total mass of the coating; for example, the mass percentage of the inorganic particles in the coating can be 70%-90%, 75%-85%, etc. When the mass percentage of the inorganic particles is controlled within the given range, the energy density of the battery can be further improved while ensuring the safety performance of the separator.

In some embodiments, the coating can further comprise second organic particles embedded in the inorganic particles and forming protrusions on the surface of the coating, and the second organic particles are secondary particles. When the coating of the separator comprises an amount of the second organic particles with a secondary particle morphology, it is helpful to form an uniform coating interface, and when the separator is used in a battery, the tabs dislocation problem during the preparation of the battery can be effectively improved, thereby further improving the safety performance of the battery.

It should be noted that, secondary particles have a meaning well-known in the art. A secondary particle refers to a particle in an agglomerated state formed by the aggregation of two or more primary particles.

Figures 1, 2:
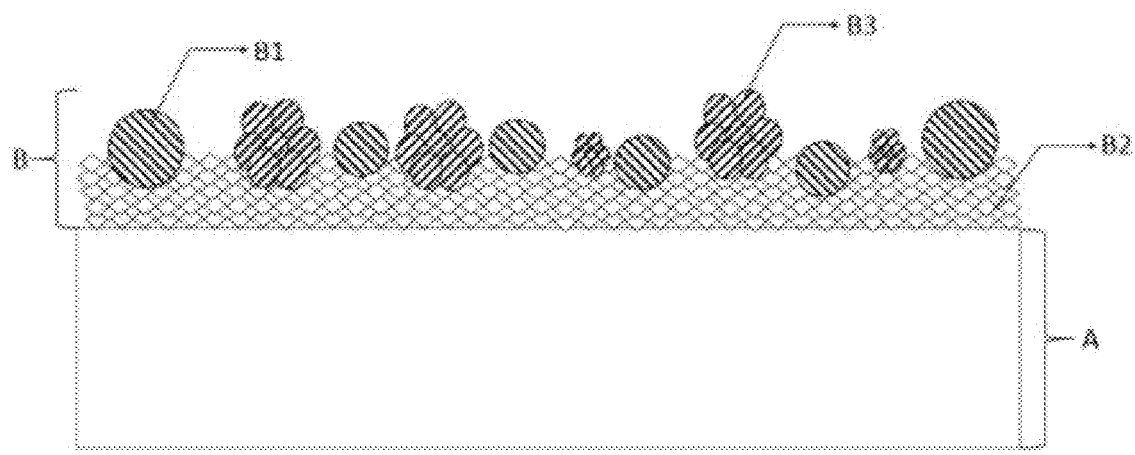
Figures 1, 2:
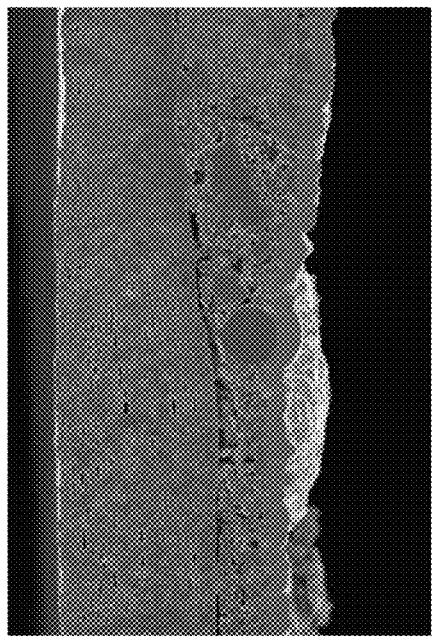

As shown in FIG. 1-2, the separator comprises a substrate (A) and a coating (B), the coating (B) comprises first organic particles (B1), inorganic particles (B2) and second organic particles (B3), wherein the first organic particles (B1) are primary particles, the second organic particles (B3) are secondary particles, and the first organic particles and second organic particles are both embedded in the inorganic particles (B2) and form protrusions on the surface of the coating (B).

In some embodiments, the second organic particles have a number-average particle size of ≥2 μm, for example, 12 μm-25 μm; for example, the second organic particles can have a number-average particle size of 15 µm-25 µm, 12 µm-23 µm, 13 µm-22 µm, 15 µm-20 µm, 12 µm-18 µm, etc. When the number-average particle size of the second organic particles is within the given range, the organic particles are enabled to have sufficient voids therebetween; even though the organic particles swell in the electrolyte, sufficient ion transmission channels can be formed, thereby further improving the cycling performance of the battery.

In some embodiments, the second organic particles can comprise one or more of a homopolymer or copolymer of a fluorine-containing olefine monomeric unit, a homopolymer or copolymer of an olefine monomeric unit, a homopolymer or copolymer of an unsaturated nitrile monomeric unit, a homopolymer or copolymer of an alkylene oxide monomeric unit, and modified compounds of these homopolymers or copolymers.

In some embodiments, the fluorine-containing olefine monomeric unit can be selected from one or more of vinylidene fluoride, fluoroethylene, trifluoroethylene, chlorotrifluoroethylene, tetrafluoroethylene, and hexafluoropropylene.

In some embodiments, the olefine monomeric unit can be selected from one or more of ethylene, propylene, butadiene, isoprene, etc.

In some embodiments, the unsaturated nitrile monomeric unit can be selected from one or more of acrylonitrile, methylacrylonitrile, etc.

In some embodiments, the alkylene oxide monomeric unit can be selected from one or more of ethylene oxide, propylene oxide, etc.

In some embodiments, the second organic particles can comprise one or more of polytetrafluoroethylene, polychlorotrifluoroethylene, polyvinyl fluoride, polyvinylidene fluoride, polyethylene, polypropylene, polyacrylonitrile, polyethylene oxide, a copolymer of different fluorine-containing olefine monomeric units, a copolymer of a fluorine-containing olefine monomeric unit and an ethylene monomeric unit, a copolymer of a fluorine-containing olefine monomeric unit and an acrylic monomeric unit, a copolymer of a fluorine-containing olefine monomeric unit and a copolymer of an acrylate monomeric unit, and modified compounds of these homopolymers or copolymers.

In some embodiments, the second organic particles can comprise one or more of a vinylidene fluoride-trifluoroethylene copolymer, a vinylidene fluoride-hexafluoropropylene copolymer, a vinylidene fluoride-trifluoroethylene-hexafluoropropylene copolymer, a vinylidene fluoride-hexafluoropropylene-acrylic acid copolymer, a vinylidene fluoride-hexafluoropropylene-acrylate copolymer, and modified compounds of these copolymers.

In an embodiment of the present application, a modified compound of the homopolymer or copolymer refers to a modified compound obtained by the copolymerization of the monomeric units in the homopolymer or copolymer with a monomer containing a specific functional group. For example, the fluorine-containing olefine monomeric units can be copolymerized with a carboxyl functional group-containing compound to obtain a modified compound thereof, etc.

In some embodiments, the first organic particles have a number-average molecular weight of 10000-100000, for example, 20000-80000, etc.

In some embodiments, the second organic particles have a number-average molecular weight of 300000-800000, for example, 400000-650000, etc.

In some embodiments, the mass percentage of the second organic particles in the coating is less than or equal to that of the first organic particles in the coating. In some embodiments, the mass percentage of the second organic particles in the coating can be 1%-10%, 1.5%-7.5%, 2%-8%, 2%-5%, and 3%-7%. By the study, the present inventors have found that when the mass percentage of the second organic particles in the coating is within the given range, the cycling performance and safety performance of the battery can be further improved.

In some embodiments, the separator has a single-sided coating weight per unit area of ≤3.0 g/m²; for example, the separator can have a single-sided coating weight per unit area of 1.5 g/m²-3.0 g/m², 1.5 g/m²-2.5 g/m², 1.8 g/m²-2.3 g/m², etc. When the single-sided coating weight per unit area on the separator is controlled within the given range, the energy density of the battery can be further improved while ensuring the cycling performance and safety performance of the battery.

According to some embodiments, the coating can further comprise other organic compounds, for example, a polymer that improves the heat resistance (referred to as "heat-resistant adhesive" for short), a dispersant, a wetting agent, other types of binders, etc. The above organic compounds are all non-granular substances in the dried coating. In the present application, the above other organic compounds are not particularly limited in types, and can be selected from any well-known materials with well improved performance.

In the present application, the material of the substrate is not particularly limited, and can be selected from any well-known substrate with good chemical and mechanical stability, for example one or more of glass fibers, a non-woven fabric, polyethylene, polypropylene, and polyvinylidene fluoride. The substrate can be a single-layer film, or a multi-layer composite film. When the substrate is a multi-layer composite film, the materials of the respective layers may be the same or different.

In some embodiments, the substrate has a thickness≤12 µm; for example, the substrate can have a thickness of 5 µm-10 µm, 5 µm-9 µm, 7 µm-12 µm, etc. When the thickness of the substrate is controlled within the given range, the energy density of the battery can be further improved while ensuring the cycling performance and safety performance of the battery.

In some embodiments, the separator can have an air permeability of 100 s/100 mL-300 s/100 mL; for example, the separator can have an air permeability of 150 s/100 mL-250 s/100 mL, 170 s/100 mL-220 s/100 mL, etc.

In some embodiments, the separator can have a longitudinal tensile strength of 1000 kgf/cm²-3500 kgf/cm²; for example, the separator can have a longitudinal tensile strength of 1200 kgf/cm²-2800 kgf/cm², 1200 kgf/cm²-2000 kgf/cm², and 1500 kgf/cm²-3000 kgf/cm².

In some embodiments, the separator can have a longitudinal elongation at break of 50%-200%; for example, the separator can have a longitudinal elongation at break of 80%-150%, etc.

In some embodiments, the separator can have a transverse tensile strength of 1000 kgf/cm²-3500 kgf/cm²; for example, the separator can have a transverse tensile strength of 1200 kgf/cm²-3000 kgf/cm², 1200 kgf/cm²-2000 kgf/cm², and 1500 kgf/cm²-3000 kgf/cm².

In some embodiments, the separator can have a transverse elongation at break of 50%-200%; for example, the separator can have a transverse elongation at break of 80%-150%, etc.

In some embodiments, the inorganic particles and the organic particles form a non-uniform pore structure in the coating.

In some embodiments, the spacing between any two adjacent inorganic particles is denoted as L1, and the spacing between any inorganic particle and an adjacent organic particle is denoted as L2, wherein L1≤L2.

According to some embodiments, the particle size and number-average particle size of the organic particles can be measured by an apparatus and method known in the art. For example, a scanning electron microscope (for example, ZEISS Sigma 300) is used to obtain an SEM image of the separator, for example, by referring to JY/T010-1996. As an example, the measurement can be carried out as follows: a test sample with length×width=50 mm×100 mm is randomly selected from the separator and a plurality of (for example, 5) test areas are randomly selected on the test sample; at a certain magnification (for example, 500× when measuring the first organic particles and 1000× when measuring the second organic particles), the particle sizes of the respective organic particles in the respective test areas are read (it should be noted that when the organic particle is of an irregular shape, the distance between two points that are farthest apart is taken as the particle size of the organic particle), to be the particle sizes of the organic particles in the present application. The numbers and particle size values of the organic particles in the respective test areas are recorded, and an arithmetic mean of the particle sizes of the organic particles in the test areas are taken as the number-average particle size of the organic particles in the test sample. In order to ensure the accuracy of the test results, the above measurement can be carried out on a plurality of (for example, 10) test samples, and an average of these test samples is taken as the final measurement result.

According to some embodiments, the morphology of the organic particles (for example: primary particle morphology or secondary particle morphology) can be determined by an apparatus and method known in the art. For example, a scanning electron microscope (for example, ZEISS Sigma 300) can be used for the determination. As an example, the following steps are performed: first, a separator is cut into a sample to be tested with a certain size (for example, 6 mm×6 mm), and the sample to be tested is sandwiched by two electrically and thermally conductive sheets (for example, copper foils), and the sample to be tested is sticked and fixed to the sheets by an adhesive (for example, a double-sided adhesive tape), and pressed with a flat iron block having a mass (for example, about 400 g) for a period of time (for example, 1 h), such that the gaps between the sample to be tested and the copper foils are as small as possible, the edges are then trimmed using scissors; the sample to be tested is sticked onto a sample stage with a conductive adhesive, with the sample slightly protruding from the edge of the sample stage. Then, the sample stage is mounted onto a sample holder and locked for fixation; the power of an argon ion cross section polisher (for example, IB-19500CP) is turned on for vacuumization (for example, 10 Pa-4 Pa); the argon flow rate (for example, 0.15 MPa) and voltage (for example, 8 KV) and polishing time (for example, 2 hours) are set, the sample stage is adjusted to a rocking mode to start the polishing; after the completion of the polishing, the ion-polished cross-sectional topography (CP) picture of the test sample is obtained by using a scanning electron microscope (for example, ZEISS Sigma 300).

FIG. 2-1 and FIG. 2-2 are ion-polished cross-sectional topography (CP) pictures of separators in embodiments of the present application. It can be seen from FIG. 2-1 that the coating of the separator comprises first organic particles, wherein the first organic particles are non-agglomerated primary particles and have a solid spherical cross-section. It can be seen from FIG. 2-2 that the coating of the separator comprises both first organic particles and second organic particles, wherein the second organic particles are secondary particles composed of a plurality of primary particles and have an irregular non-solid spherical cross-section.

According to some embodiments, the material type of the organic particles can be determined by an apparatus and method known in the art. For example, the infrared spectrum of the material can be measured, so as to determine the characteristic peaks contained therein, and thus to determine the material type. Specifically, the organic particles can be analyzed by infrared spectroscopy using instruments and methods known in the art, for example an infrared spectrometer, for example, be determined by an IS10 Fourier transform infrared spectrometer from Nicolet, USA, and according to the GB/T6040-2002 General rules for infrared spectrum analysis.

According to some embodiments, the volume-average particle size $Dv_{50}$ of the inorganic particles has the meaning well-known in the art, and can be determined by an instrument and method known in the art. For example, it can be determined by referring to GB/T 19077-2016 particle size distribution-laser diffraction method, using a laser particle size analyzer (for example, Master Size 3000).

According to some embodiments, the air permeability, transverse tensile strength (TD), longitudinal tensile strength (MD), transverse elongation at break, and longitudinal elongation at break of the separator all have meanings well-known in the art, and can be determined according to methods known in the art. For example, they can all be determined by referring to GB/T 36363-2018.

According to some embodiments, the spacing between any two adjacent inorganic particles is determined by randomly selecting two inorganic particles in the coating (when the inorganic particles are of an irregular shape, the particles can be circumscribed to form a circle) in the SEM image of the separator, and measuring the spacing between the centers of circles of the two inorganic particles as the spacing between the two inorganic particles, denoted as L1.

According to some embodiments, the spacing between any inorganic particle and an adjacent organic particle is determined by randomly selecting an inorganic particle and an organic particle in the coating (when the inorganic particle or organic particle are of an irregular shape, the particle can be circumscribed to form a circle) in the SEM image of the separator, and measuring the spacing between the centers of circles of the inorganic particle and the organic particle as the spacing between the inorganic particle and the organic particle, denoted as L2. The mentioned organic particle may be a first organic particle, or a second organic particle.

The spacing can be determined using an instrument known in the art. For example, it can be determined by a scanning electron microscope. As an example, the spacing L2 between any inorganic particle and an adjacent organic particle can be measured as follows: a separator is made into a test sample with length×width=50 mm×100 mm; the separator is measured using a scanning electron microscope (for example, ZEISS Sigma300). The measurement can be carried out by referring to JY/T010-1996. An area is randomly selected in the test sample for scanning, to obtain an SEM image of the separator under a certain magnification (for example, 3000×); in the SEM image, an inorganic particle and an adjacent organic particle are randomly selected (when the inorganic particle or organic particle is an irregular body, the particle can be circumscribed to form a circle), to measure the distance between the centers of circles of the inorganic particle (or the circumscribed circle thereof) and the organic particle (or the circumscribed circle thereof), as the spacing between the inorganic particle and adjacent organic particle of the present application, denoted as L2. In order to ensure the accuracy of the measurement results, a number of groups of adjacent particles (for example, 10 groups) can be selected in the test sample to repeat the measurement, and an average of the test results on the groups are taken as the final result.

Similarly, the spacing between any two adjacent inorganic particles L1 can also be measured according to the above method.

Figures 1, 3:
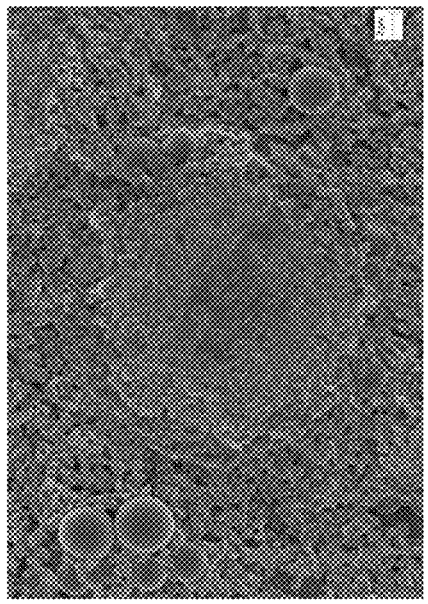
Figure 2:
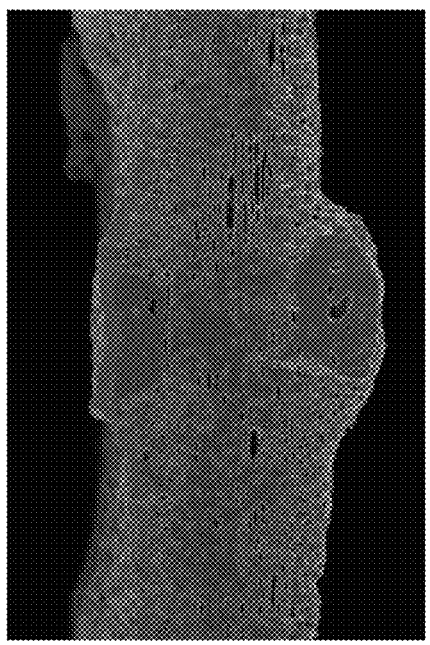
Figures 2, 3:
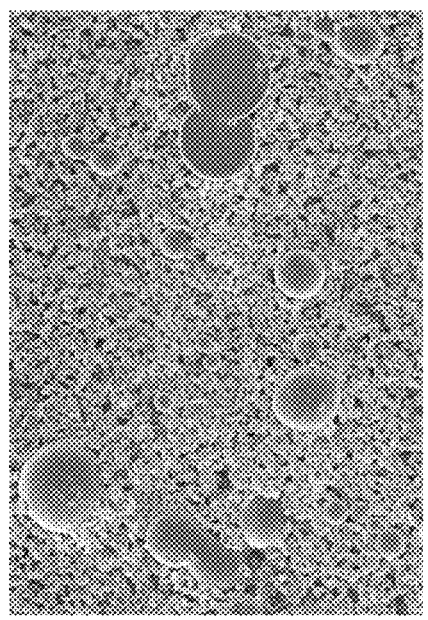

FIGS. 3-1 and 3-2 are scanning electron microscope (SEM) images of separators in embodiments of the present application. It can be seen from FIG. 3-1 that the coating of the separator comprises inorganic particles and first organic particles, wherein the first organic particles are primary particles, and the first organic particles are embedded in the inorganic particles and form protrusions on the surface of the coating. It can be seen from FIG. 3-2 that, the coating of the separator comprises inorganic particles, first organic particles and second organic particles, wherein the first organic particles are primary particles, the second organic particles are secondary particles, and the first organic particles and second organic particles are both embedded in the inorganic particles and form protrusions on the surface of the coating. By the measurement according to the method described above, it can be derived that L1≤L2.

The present application also provides a method for preparing the separator, comprising the following steps:

(1) providing a substrate;

(2) providing a coating slurry, comprising a component material and a solvent, wherein the component material comprises inorganic particles and organic particles, and the organic particles comprise first organic particles; and (3) coating at least one side of the substrate from step (1) with the coating slurry from step (2) so as to form a coating, and drying same to obtain the separator;

wherein the separator comprises a substrate and a coating formed on at least one surface of the substrate; the coating comprises inorganic particles and first organic particles embedded in the inorganic particles and forming protrusions on the surface of the coating; and the first organic particles have a primary particle morphology and a number-average particle size of ≥2 μm.

The coating can be provided on only one surface of the substrate, or on both surfaces of the substrate.

As shown in FIG. 4-1, the separator comprises a substrate (A) and a coating (B), and the coating (B) is provided on only one surface of the substrate (A).

As shown in FIG. 4-2, the separator comprises a substrate (A) and a coating (B), and the coating (B) is provided on both surfaces of the substrate (A) at the same time.

In an embodiment of the present application, the material of the substrate is not particularly limited, and can be selected from any well-known substrate with good chemical and mechanical stability, for example one or more of glass fibers, a non-woven fabric, polyethylene, polypropylene, and polyvinylidene fluoride. The substrate can be a single-layer film, or a multi-layer composite film. When the substrate is a multi-layer composite film, the materials of the respective layers may be the same or different.

In some embodiments, in step (2), the solvent can be water, for example, deionized water.

In some embodiments, in step (2), the component material also can comprise the second organic particles described herein.

In some embodiments, in step (2), the component material also can comprise other organic compounds, for example, a polymer that improves the heat resistance (referred to as "heat-resistant adhesive" for short), a dispersant, a wetting agent, other types of binders, etc. In such a case, the above organic compounds are all non-granular substances in the dried coating. In the present application, the above other organic compounds are not particularly limited in type, and can be selected from any well-known materials with well improved performance.

In some embodiments, in step (2), a component material is added to the solvent and stirred uniformly to obtain a coating slurry.

In some embodiments, in step (2), the first organic particles are added in a mass percentage of 10% or more of the total dry weight of the component material; for example, 10%-30%, 15%-30%, 10%-25%, and 10%-20%.

In some embodiments, in step (2), the second organic particles are added in a mass less than or equal to the mass of the first organic particles that are added. in some embodiments, the second organic particles are added in a mass percentage of 1%-10% of the total dry weight of the component material; for example, it can be 1.5%-7.5%, 2%-8%, 2%-5% or 3%-7%.

An appropriate content of the organic particles can reduce the static electricity generated between the separator and a battery winding tool (such as, a rolling pin) or laminating tool during the preparation of the battery, and effectively reduce the probability of short circuit between the positive electrode and negative electrode, thereby improving the manufacturing yield of the battery.

It should be noted that, when the component material is in a solid state, the dry weight of the component material is the mass of the component material that is added. When the component material is in a suspension, an emulsion or a solution, the dry weight of the component material is a product of the mass of the component material that is added and the solid content of the component material. The total dry weight of the component material ingredients is the sum of the dry weights of the component material ingredients.

In some embodiments, in step (2), the solid content of the coating slurry can be controlled at 28%-45%, for example, 30%-38%, based on the wight of the coating slurry. When the solid content of the coating slurry is within the above range, the film surface problem of the coating can be effectively reduced and the probability of non-uniform coating can be reduced, thereby further improving the cycling performance and safety performance of the battery.

In some embodiments, in step (3), the coating is carried out by a coating machine.

In an embodiment of the present application, the model of the coating machine is not particularly limited, and a commercially available coating machine can be used.

In some embodiments, in step (3), the coating can be carried out by a process, such as transfer coating, rotary spraying, dip coating, etc.; for example, the coating is carried out by transfer coating.

In some embodiments, the coating machine comprises a gravure roll; and the gravure roller is generally a cylindrical steel roller with various shapes of slurry grooves engraved on the roller surface for transferring the coating slurry to the substrate.

In some embodiments, the gravure roller can have a number of lines of 100 LPI-300 LPI, for example, 125 LPI-190 LPI (LPI represents lines/inch). the higher the number of lines of the roll, the less the amount of the slurry that the roller transfers. When the number of lines of the gravure roller is within the above range, it is helpful to control the number of the first organic particles and the second organic particles, thereby further improving the cycling performance and safety of the separator.

In some embodiments, in step (3), the speed for coating can be controlled at 30 m/min-90 m/min, for example, 50 m/min-70 m/min. When the speed for the coating is within the above range, the film surface problem of the coating can be effectively reduced, and the probability of non-uniform coating can be reduced, thereby further improving the cycling performance and safety performance of the battery.

In some embodiments, in step (3), the line speed ratio for coating can be controlled at 0.8-2.5, for example, 0.8-1.5, and 1.0-1.5.

In some embodiments, in step (3), the drying can be carried out at a temperature of 40° C. to 70° C., for example, 50° C. to 60° C.

In some embodiments, in step (3), the drying can be carried out for a period of 10 s-120 s, for example, 20 s-80 s, and 20 s-40 s.

By controlling the above process parameters within the given ranges, the operational performance of the separator in the present application can be further improved. Those of ordinary skill in the art can selectively adjust and control one or more of the above process parameters according to the actual production.

In order to further improve the performance of the secondary battery, the inorganic particles and the organic particles also satisfy one or more of the aforementioned parameter conditions. It will not be repeated here.

The above substrate, first organic particles and second organic particles are all commercially available.

In the method for preparing the separator of the present application, the coating is prepared by one-time coating, which greatly simplifies the production process for a separator; Meanwhile, the use of the separator prepared by the above method in a battery can effectively improve the cycling performance and safety performance of the battery.

[Positive Electrode Plate]

In a secondary battery, a positive electrode plate generally comprises a positive electrode current collector and a positive electrode film layer provided on the positive electrode current collector, wherein the positive electrode film layer comprises a positive electrode active material.

The positive electrode current collector may be a conventional metal foil or a composite current collector (for example, a composite current collector can be formed by providing a metal material on a polymer substrate). As an example, the positive electrode current collector may be an aluminum foil.

The specific types of the positive electrode active materials are not limited, and active materials known in the art that can be used for the positive electrode of secondary batteries can be used, and the active materials can be selected by those skilled in the art according to actual requirements.

As an example, the positive electrode active material can include, but is not limited to, one or more of lithium transition metal oxides, lithium-containing phosphates with a olivine structure and the respective modified compounds thereof. An example of the lithium transition metal oxide can include, but is not limited to, one or more of lithium cobalt oxides, lithium nickel oxides, lithium manganese oxides, lithium nickel cobalt oxides, lithium manganese cobalt oxides, lithium nickel manganese oxides, lithium nickel cobalt manganese oxides, lithium nickel cobalt aluminum oxides and the respective modified compounds thereof. An example of the lithium-containing phosphates with a olivine structure can include, but is not limited to, one or more of lithium iron phosphate, a lithium iron phosphate-carbon composite, lithium manganese phosphate, a lithium manganese phosphate-carbon composite, lithium iron manganese phosphate, a lithium iron manganese phosphate-carbon composite and modified compounds thereof. These materials are all commercially available.

In some embodiments, modified compounds of the material can be from the doping modification and/or surface coating modification of the material.

The positive electrode film layer typically also comprises a binder, a conductive agent and other optional auxiliary agents.

As an example, the conductive agent can be one or more of superconducting carbon, acetylene black, carbon black, Ketjen black, carbon dots, carbon nanotubes, Super P (SP), graphene and carbon nanofibers.

As an example, the binder can be one or more of a styrene-butadiene rubber (SBR), a water-based acrylic resin (water-based acrylic resin), polyvinylidene fluoride (PVDF), polytetrafluoroethylene (PTFE), ethylene-vinyl acetate copolymer (EVA), polyacrylic acid (PAA), carboxymethyl cellulose (CMC), polyvinyl alcohol (PVA) and polyvinyl butyral (PVB).

[Negative Electrode Plate]

In a secondary battery, a negative electrode plate generally comprises a negative electrode current collector and a negative electrode film layer provided on the negative electrode current collector, wherein the negative electrode film layer comprises a negative electrode active material.

The negative electrode current collector may be a conventional metal foil or a composite current collector (for example, a composite current collector can be formed by providing a metal material on a polymer substrate). As an example, the negative electrode current collector may be a copper foil.

The specific types of the negative electrode active materials are not limited, and active materials known in the art that can be used for the negative electrode of secondary batteries can be used, and the active materials can be selected by a person skilled in the art according to actual requirements. As an example, the negative electrode active material can include, but is not limited to, one or more of synthetic graphite, natural graphite, hard carbon, soft carbon, a silicon-based material and a tin-based material. The silicon-based material can be selected from one or more of elemental silicon, a silicon oxide compound (for example, silicon(II) oxide), a silicon-carbon composite, a silicon-nitrogen composite, and a silicon alloy. The tin-based material can be selected from one or more of elemental tin, a tin oxide compound, and a tin alloy. These materials are all commercially available.

In some embodiments, in order to further improve the energy density of the battery, the negative electrode active material comprises a silicon-based material.

The negative electrode film layer generally also comprises a binder, a conductive agent and other optional auxiliary agents.

As an example, the conductive agent can be one or more of superconducting carbon, acetylene black, carbon black, Ketjen black, carbon dots, carbon nanotubes, graphene and carbon nanofibers.

As an example, the binder can be one or more of a styrene-butadiene rubber (SBR), a water-based acrylic resin (water-based acrylic resin), polyvinylidene fluoride (PVDF), polytetrafluoroethylene (PTFE), an ethylene-vinyl acetate copolymer (EVA), polyvinyl alcohol (PVA) and polyvinyl butyral (PVB).

As an example, other optional auxiliary agents may be a thickening and dispersing agent (for example, sodium carboxymethyl cellulose, CMC-Na), a PTC thermistor material etc.

[Electrolyte]

The secondary battery can comprises an electrolyte, wherein the electrolyte is between the positive electrode and the negative electrode and functions for ionic conduction. The electrolyte can comprise an electrolyte salt and a solvent.

As an example, the electrolyte salt can be selected from one or more of LiPF6 (lithium hexafluorophosphate), LiBF4 (lithium tetrafluoroborate), LiClO4 (lithium perchlorate), LiAsF6 (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluorooxalate borate), LiBOB (lithium dioxalate borate), LiPO2F2 (lithium difluorophosphate), LiDFOP (lithium bisoxalatodifluorophosphate) and LiTFOP (lithium tetrafluorooxalate phosphate).

As an example, the solvent can be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS) and diethyl sulfone (ESE).

In some embodiments, the electrolyte also comprises an additive. For example, the additive can include a negative electrode film-forming additive, a positive electrode film-forming additive, and also an additive that can improve certain performance of the battery, such as an additive to improve the overcharge performance of a battery, an additive to improve the high temperature performance of a battery, and an additive to improve the low temperature performance of a battery, etc.

In some embodiments, the secondary battery of the present application is a lithium-ion secondary battery.

The secondary battery can be prepared according to conventional methods in the art, for example, by winding (or laminating) a positive electrode plate, a separator, and a negative electrode plate in sequence, such that the separator is disposed between the positive electrode plate and the negative electrode plate and has a separation function, to obtain a battery cell, placing the battery cell into an outer package, injecting an electrolyte and sealing same, to obtain a secondary battery.

Figure 5:
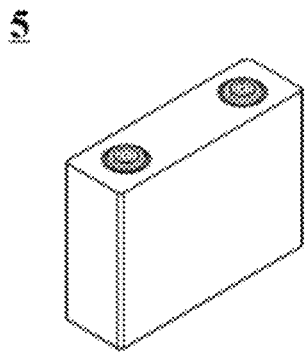
FIG. 5 is a schematic diagram of an embodiment of a secondary battery.

In embodiments of the present application, the shape of the secondary battery is not particularly limited, which can be a cylindrical shape, a prismatic shape or any other shapes. FIG. 5 shows a prismatic secondary battery 5 as an example.

In some embodiments, the secondary battery can comprises an outer package. The outer package is used for packaging the positive electrode plate, the negative electrode plate and the electrolyte.

Figure 6:
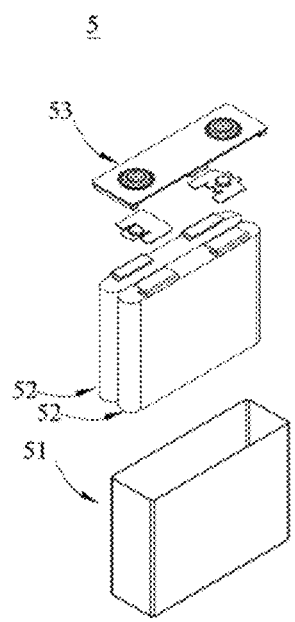
FIG. 6 is an exploded view of FIG. 5.

In some embodiments, referring to FIG. 6, the outer package can include a housing 51 and a cover plate 53, wherein the housing 51 can include a bottom plate and side plates connected to the bottom plate, and the bottom plate and the side plates enclose and form an accommodating cavity. The housing 51 has an opening in communication with the accommodating cavity, and the cover plate 53 can cover the opening to close the accommodating cavity.

The positive electrode plate, the negative electrode plate and the separator can form an electrode assembly 52 by a winding process or a lamination process. The electrode assembly 52 is packaged in the accommodating cavity. The electrolyte is infiltrate into the electrode assembly 52. The number of the electrode assemblies 52 contained in the secondary battery 5 may be one or more, and may be adjusted according to requirements.

In some embodiments, the outer package of the secondary battery can be a hard shell, for example, a hard plastic shell, an aluminum shell, a steel shell, etc. The outer package of the secondary battery can also be a soft bag, such as a pouch-type soft bag. The material of the soft bag can be a plastic, for example, comprising one or more of polypropylene (PP), polybutylene terephthalate (PBT), polybutylene succinate (PBS), etc.

In some embodiments, the secondary battery can be assembled into a battery module, and the number of the secondary batteries contained in the battery module can be multiple, and the specific number can be adjusted according to the application and capacity of the battery module.

Figure 7:
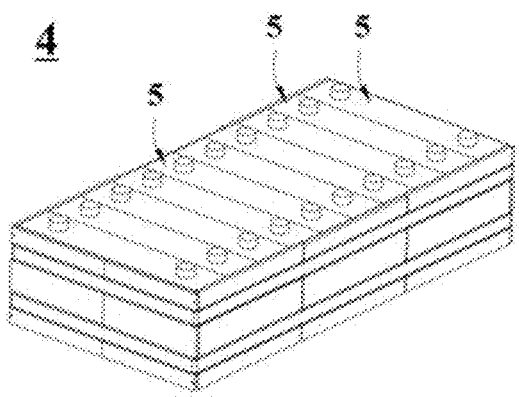
FIG. 7 is a schematic diagram of an embodiment of a battery module.

FIG. 7 shows a battery module 4 as an example. In the battery module 4, a plurality of secondary batteries 5 can be provided sequentially in the length direction of the battery module 4. Apparently, the secondary batteries can also be disposed in any other manner. Furthermore, the plurality of secondary batteries 5 can be fixed by fasteners.

In some embodiments, the battery module 4 may also comprise a housing with an accommodating space, and a plurality of secondary batteries 5 are accommodated in the accommodating space.

In some embodiments, the above battery module can also be assembled into a battery pack, and the number of the battery modules contained in the battery pack can be adjusted according to the application and capacity of the battery pack.

Figure 8:
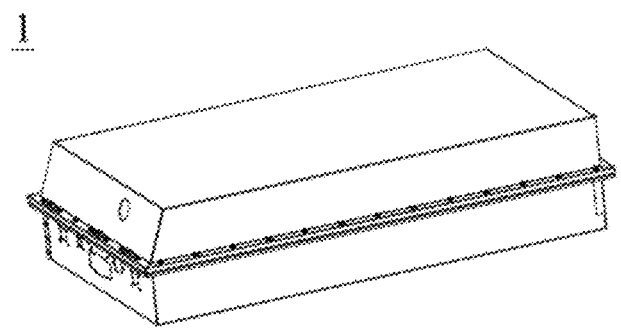
FIG. 8 is a schematic diagram of an embodiment of a battery pack.
Figure 9:
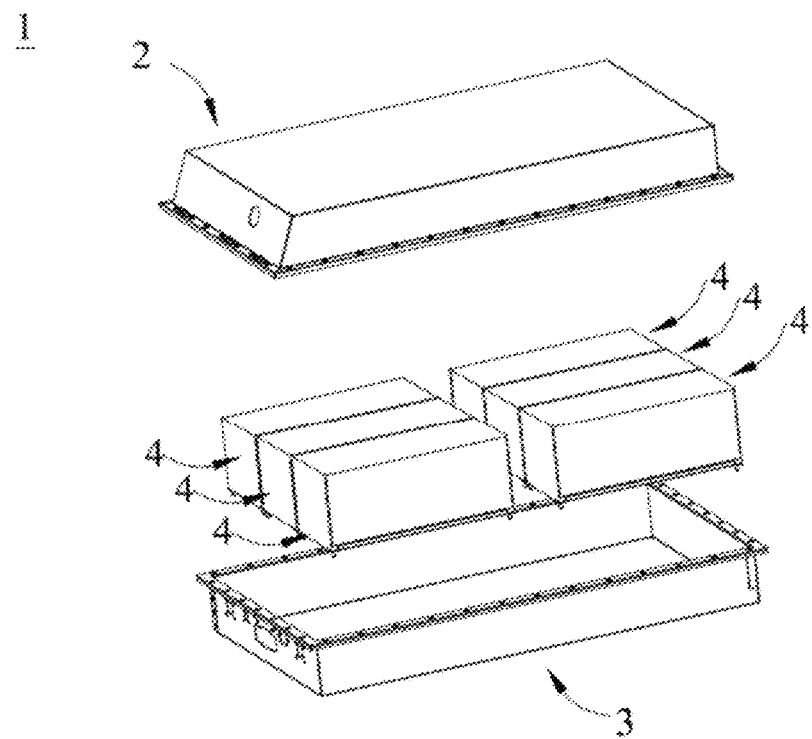
FIG. 9 is an exploded view of FIG. 8.

FIG. 8 and FIG. 9 show a battery pack 1 as an example. The battery pack 1 can include a battery case and a plurality of battery modules 4 provided in the battery case. The battery case comprises an upper case body 2 and a lower case body 3, wherein the upper case body 2 can cover the lower case body 3 to form a closed space for accommodating the battery modules 4. A plurality of battery modules 4 can be disposed in the battery case in any manner.

Device

The present application further provides a device which comprises at least one of the secondary battery, battery module, or battery pack. The secondary battery, battery module or battery pack may be used as a power source of the device or as an energy storage unit of the device. The device may be, but is not limited to, a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf cart, an electric truck), an electric train, ship, and satellite, an energy storage system, and the like.

The device can incorporate the secondary battery, battery module or battery pack according to its usage requirements.

Figure 10:
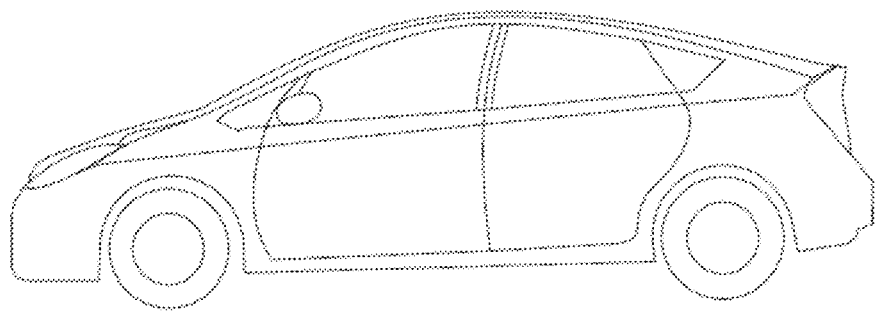
FIG. 10 is a schematic diagram of an embodiment of an device with a secondary battery as a power source.

FIG. 10 shows a device as an example. The device may be a pure electric vehicle, a hybrid electric vehicle, a plug-in hybrid electric vehicle or the like. In order to meet the requirements of the device for a high power and a high energy density of a secondary battery, a battery pack or a battery module can be used.

As another example, the device may be a mobile phone, a tablet, a laptop computer, etc. The device is generally required to be thin and light, and may use a secondary battery as a power source.

The beneficial effects of the present application will be further described below in conjunction with embodiments.

EXAMPLES

In order to make the technical problems solved by, the technical solutions and the beneficial effects of, the present application clearer, further detailed description will be given below with reference to the embodiments and the accompanying drawings. Apparently, the described embodiments are merely some of, but not all of, the embodiments of the present application. The following description of at least one exemplary embodiment is merely illustrative in nature and is in no way to limit the present application and the use thereof. All the other embodiments obtained by those of ordinary skill in the art based on the embodiments of the present application without any creative effort shall fall within the scope of protection of the present application.

Materials used in the examples of the present application are all commercially available, for example:

the substrate can be purchased from Shanghai Enjie New Materials Co., Ltd.;

the inorganic particles can be purchased from Estone Materials Technology Co Ltd.;

the first organic particles can be purchased from Arkema (Changshu) Chemical Co., Ltd.;

the second organic particles can be purchased from Sichuan Indile Technology Co., Ltd.;

the wetting agent can be purchased from Dow Chemical Company; and the dispersant can be purchased from Changshu Weiyi Technology Co., Ltd.

I. Preparation of Separator separator 1:

(1) a PE substrate is provided, for example, the substrate having a thickness of 7 μm, and a porosity of 36%;

(2) formulation of coating slurry: inorganic particles of aluminum oxide ($Al_2O_3$), first organic particles of a butyl methacrylate-isooctyl acrylate-styrene copolymer, a dispersant of sodium carboxymethyl cellulose (CMC-Na) and a wetting agent of an organosilicon modified polyether are uniformly mixed at a mass ratio of 80:15:3:2 in deionized water to obtain a coating slurry with a solid content of 35% based on the weight of the coating slurry, wherein the inorganic particles of aluminum oxide ($Al_2O_3$) have a volume-average particle size $Dv_{50}$ of 1 μm, the first organic particles have a number-average particle size of 2 μm and a primary particle morphology, at least part of the first organic particles comprise a core structure and a shell structure, the shell structure has a glass transition temperature of 55° C., and the core structure has a glass transition temperature of 20° C.;

(3) the two surfaces of the PE substrate are coated with the coating slurry formulated in step (2) using a coating machine, followed by drying and slitting procedures, to obtain separator 1, wherein the gravure roller of the coating machine has a number of lines of 190 LPI, and the coating is carried out at a speed of 70 m/min and a line speed ratio of 1.3; the separator has a single-sided coating weight per unit area of 2.0 g/m². In this separator, the first organic particles are embedded in the inorganic particles and form protrusions on the surface of the coating.

The preparation methods for separators 2-18 and comparative separators 1-4 are similar to that for separator 1, except that: the number-average particle size, mass percentage, material types or particle morphology of the first organic particles have been adjusted, see Table 1 for details.

The preparation methods for separators 19-35 are similar to that for separator 1, except that: second organic particles are further added to the coating, and the number-average particle size, mass percentage and material types thereof have been adjusted, see Table 2 for details.

II. Preparation of battery

Example 1

1. Preparation of positive electrode plate

A positive electrode active material of $LiNi_{0.5}Co_{0.2}Mn_{0.3}O_2$ (NCM523), a conductive agent of carbon black (Super P), and a binder of polyvinylidene fluoride (PVDF) are uniformly mixed at a mass ratio of 96.2:2.7:1.1 in a solvent of N-methyl pyrrolidone (NMP), to obtain a positive electrode slurry; then the positive electrode slurry is coated onto a positive electrode current collector of aluminum foil, followed by drying, cold pressing, slitting and cutting procedures, to obtain a positive electrode plate.

2. Preparation of Negative Electrode Plate

A negative electrode active material of synthetic graphite, a conductive agent of carbon black (Super P), a binder of styrene-butadiene rubber (SBR) and sodium carboxymethyl cellulose (CMC-Na) are uniformly mixed at a mass ratio of 96.4:0.7:1.8:1.1 in a solvent of deionized water to obtain a negative electrode slurry; then the negative electrode slurry is coated onto a negative electrode current collector of copper foil, followed by drying, cold pressing, slitting and cutting procedures, to obtain a negative electrode plate.

3. Separator

Separator 1 prepared as above is used.

4. Preparation of electrolyte

Ethylene carbonate (EC) and ethyl methyl carbonate (EMC) are mixed at a mass ratio of 30:70, to obtain an organic solvent; then a fully dried electrolyte salt of $LiPF_6$ is dissolved in the above mixed solvent, with an electrolyte salt concentration of 1.0 mol/L, and uniformly mixed to obtain an electrolyte.

5. Preparation of secondary battery

The positive electrode plate, the separator, and the negative electrode plate are laminated in sequence, such that the separator is located between the positive electrode plate and the negative electrode plate and functions for separation, and then they are wound to obtain an electrode assembly; the electrode assembly is placed in an outer package; the electrolyte prepared as above is injected into the dried electrode assembly, followed by vacuum packaging, leaving to stand, formation, and shaping procedures to obtain a secondary battery.

The preparation methods for the secondary batteries in examples 2-18, examples 19-35 and comparative examples 1-4 are similar to that for the secondary battery in example 1, except that different separators are used, see Table 1 for details.

III. Battery performance test

1. Cycling performance at 25° C.

At 25° C., the secondary batteries prepared in the examples and comparative examples are charged at a constant current rate of 1 C to an end-of-charge voltage of 4.2 V, then charged at a constant voltage to a current of ≤0.05 C, left to stand for 30 min, then discharged at a constant current rate of 0.33 C to an end-of-discharge voltage of 2.8 V, and left to stand for 30 min; the battery capacity C0 at the moment is recorded. The battery is charged and discharged for 1500 cycles as per this method, and the battery capacity after 1500 cycles is recorded as C1.

The cycling capacity retention rate of the battery at 25° C.=C1/C0×100%. 2. Thermal propagation performance At 25° C., the secondary batteries prepared in the examples and comparative examples are charged at a constant current rate of 1 C to an end-of-charge voltage of 4.2 V, then charged at a constant voltage to a current of ≤0.05 C, and left to stand for 10 min; then a metal heating plate is tightly attached onto the surface of the battery, clamped by a fixture, with a 3 mm thermal insulation pad being sandwiched between the fixture and the battery, and heated at a constant temperature of 200° C. until a thermal runaway of the battery occurs; the time at which the thermal runaway of the battery occurs is recorded.

The tested battery performance of the examples and comparative examples is given in Tables 1 and 2.

TABLE 1

| No. | | First organic particle | | | | Mass ratio of component in coating | Battery Performance | |
|---|---|---|---|---|---|---|---|---|
| | | Type | Morphology | Number-average particle size (μm) | Mass percentage in coating (%) | Inorganic particle: first organic particle: dispersant: wetting agent | Cycling capacity retention rate | Thermal propagation time/second (s) |
| Example 1 | Separator 1 | Butyl methacrylate-isooctyl acrylate-styrene copolymer | Primary particle | 2.0 | 15% | 80:15:3:2 | 86.5% | 510 |
| Example 2 | Separator 2 | Butyl methacrylate-isooctyl acrylate-styrene copolymer | Primary particle | 3.3 | 15% | 80:15:3:2 | 87.2% | 316 |
| Example 3 | Separator 3 | Butyl methacrylate-isooctyl acrylate-styrene copolymer | Primary particle | 4.0 | 15% | 80:15:3:2 | 88.7% | 527 |
| Example 4 | Separator 4 | Butyl methacrylate-isooctyl acrylate-styrene copolymer | Primary particle | 5.0 | 15% | 80:15:3:2 | 90.1% | 560 |
| Example 5 | Separator 5 | Butyl methacrylate-isooctyl acrylate-styrene copolymer | Primary particle | 6.0 | 15% | 80:15:3:2 | 89.9% | 543 |
| Example 6 | Separator 6 | Butyl methacrylate-isooctyl acrylate-styrene copolymer | Primary particle | 7.0 | 15% | 80:15:3:2 | 88.7% | 535 |
| Example 7 | Separator 7 | Butyl methacrylate-isooctyl acrylate-styrene copolymer | Primary particle | 8.0 | 15% | 80:15:3:2 | 88.5% | 526 |
| Example 8 | Separator 8 | Butyl methacrylate-isooctyl acrylate-styrene copolymer | Primary particle | 9.0 | 15% | 80:15:3:2 | 88.2% | 374 |
| Example 9 | Separator 9 | Butyl methacrylate-isooctyl acrylate-styrene copolymer | Primary particle | 10.0 | 15% | 80:15:3:2 | 86.5% | 365 |
| Example 10 | Separator 10 | Butyl methacrylate-isooctyl acrylate-styrene copolymer | Primary particle | 12.0 | 15% | 80:15:3:2 | 82.8% | 361 |
| Example 11 | Separator 11 | Butyl methacrylate-isooctyl acrylate-styrene copolymer | Primary particle | 15.0 | 15% | 80:15:3:2 | 81.2% | 337 |
| Example 12 | Separator 12 | Butyl methacrylate-isooctyl acrylate-styrene copolymer | Primary particle | 4.0 | 5.0% | 90:5:3:2 | 84.2% | 488 |
| Example 13 | Separator 13 | Butyl methacrylate-isooctyl acrylate-styrene copolymer | Primary particle | 4.0 | 10.0% | 85:10:3:2 | 86.2% | 512 |
| Example 14 | Separator 14 | Butyl methacrylate-isooctyl acrylate-styrene copolymer | Primary particle | 4.0 | 20.0% | 75:20:3:2 | 86.7% | 530 |
| Example 15 | Separator 15 | Butyl methacrylate-isooctyl acrylate-styrene copolymer | Primary particle | 4.0 | 25.0% | 70:25:3:2 | 85.6% | 431 |
| Example 16 | Separator 16 | Butyl methacrylate-isooctyl acrylate-styrene copolymer | Primary particle | 4.0 | 30.0% | 65:30:3:2 | 81.5% | 421 |
| Example 17 | Separator 17 | Styrene-vinyl acetate copolymer | Primary particle | 4.0 | 15% | 80:15:3:2 | 85.5% | 483 |
| Example 18 | Separator 18 | Styrene-vinyl acetate-pyrrolidone copolymer | Primary particle | 4.0 | 15% | 80:15:3:2 | 88.1% | 470 |
| Comparative example 1 | Comparative separator 1 | Butyl methacrylate-isooctyl acrylate-styrene copolymer | Primary particle | 0.5 | 15% | 80:15:3:2 | 74.5% | 313 |

TABLE 1-continued

| | | First organic particle | | | Mass ratio of component in coating | Battery Performance | |
|---|---|---|---|---|---|---|---|
| No. | Type | | Morphology | Number-average particle size (μm) | Mass percentage in coating (%) | Inorganic particle: first organic particle: dispersant: wetting agent | Cycling capacity retention rate | Thermal propagation time/ second (s) |
| Comparative example 2 | Comparative separator 2 | Butyl methacrylate-isooctyl acrylate-styrene copolymer | Primary particle | 0.8 | 15% | 80:15:3:2 | 75.2% | 284 |
| Comparative example 3 | Comparative separator 3 | Butyl methacrylate-isooctyl acrylate-styrene copolymer | Secondary particle | 4.0 | 15% | 80:15:3:2 | 81.0% | 301 |
| Comparative example 4 | Comparative separator 4 | Butyl methacrylate-isooctyl acrylate-styrene copolymer | Secondary particle | 0.8 | 15% | 80:15:3:2 | 75.4% | 261 |

TABLE 2

| | | First organic particle | | | | Second organic particle | |
|---|---|---|---|---|---|---|---|
| | | First organic particle type | Morphology | Number-average particle size (μm) | Mass percentage in coating (%) | Second organic particle type | Morphology |
| Example 19 | Separator 19 | Butyl methacrylate-isooctyl acrylate-styrene copolymer | Primary particle | 4.0 | 10.0% | Vinylidene fluoride-hexafluoropropylene copolymer | Secondary particle |
| Example 20 | Separator 20 | Butyl methacrylate-isooctyl acrylate-styrene copolymer | Primary particle | 4.0 | 10.0% | Vinylidene fluoride-hexafluoropropylene copolymer | Secondary particle |
| Example 21 | Separator 21 | Butyl methacrylate-isooctyl acrylate-styrene copolymer | Primary particle | 4.0 | 10.0% | Vinylidene fluoride-hexafluoropropylene copolymer | Secondary particle |
| Example 22 | Separator 22 | Butyl methacrylate-isooctyl acrylate-styrene copolymer | Primary particle | 4.0 | 10.0% | Vinylidene fluoride-hexafluoropropylene copolymer | Secondary particle |
| Example 23 | Separator 23 | Butyl methacrylate-isooctyl acrylate-styrene copolymer | Primary particle | 4.0 | 10.0% | Vinylidene fluoride-hexafluoropropylene copolymer | Secondary particle |
| Example 24 | Separator 24 | Butyl methacrylate-isooctyl acrylate-styrene copolymer | Primary particle | 4.0 | 10.0% | Vinylidene fluoride-hexafluoropropylene copolymer | Secondary particle |
| Example 25 | Separator 25 | Butyl methacrylate-isooctyl acrylate-styrene copolymer | Primary particle | 4.0 | 10.0% | Vinylidene fluoride-hexafluoropropylene copolymer | Secondary particle |
| Example 26 | Separator 26 | Butyl methacrylate-isooctyl acrylate-styrene copolymer | Primary particle | 4.0 | 10.0% | Vinylidene fluoride-hexafluoropropylene copolymer | Secondary particle |
| Example 27 | Separator 27 | Butyl methacrylate-isooctyl acrylate-styrene copolymer | Primary particle | 4.0 | 10.0% | Vinylidene fluoride-hexafluoropropylene copolymer | Secondary particle |
| Example 28 | Separator 28 | Butyl methacrylate-isooctyl acrylate-styrene copolymer | Primary particle | 4.0 | 10.0% | Vinylidene fluoride-hexafluoropropylene copolymer | Secondary particle |
| Example 29 | Separator 29 | Butyl methacrylate-isooctyl acrylate-styrene copolymer | Primary particle | 4.0 | 10.0% | Vinylidene fluoride-hexafluoropropylene copolymer | Secondary particle |
| Example 30 | Separator 30 | Butyl methacrylate-isooctyl acrylate-styrene copolymer | Primary particle | 4.0 | 10.0% | Vinylidene fluoride-hexafluoropropylene copolymer | Secondary particle |
| Example 31 | Separator 31 | Butyl methacrylate-isooctyl acrylate-styrene copolymer | Primary particle | 4.0 | 10.0% | Vinylidene fluoride-hexafluoropropylene copolymer | Secondary particle |
| Example 32 | Separator 32 | Butyl methacrylate-isooctyl acrylate-styrene copolymer | Primary particle | 4.0 | 10.0% | Vinylidene fluoride-hexafluoropropylene copolymer | Secondary particle |
| Example 33 | Separator 33 | Butyl methacrylate-isooctyl acrylate-styrene copolymer | Primary particle | 4.0 | 10.0% | Vinylidene fluoride-hexafluoropropylene copolymer | Secondary particle |

TABLE 2-continued

| | | | | | | | |
|---|---|---|---|---|---|---|---|
| Example 34 | Separator 34 | Butyl methacrylate-isooctyl acrylate-styrene copolymer | Primary particle | 4.0 | 10.0% | Polyethylene | Secondary particle |
| Example 35 | Separator 35 | Butyl methacrylate-isooctyl acrylate-styrene copolymer | Primary particle | 4.0 | 10.0% | Vinylidene fluoride-hexafluoropropylene acrylic acid copolymer | Secondary particle |

| | | Second organic particle | | Mass ratio of components in coating inorganic particle: | Battery performance | |
|---|---|---|---|---|---|---|
| | | Number-average particle size (μm) | Mass percentage in coating (%) | first organic particle: second organic particle: dispersant: wetting agent | Cycling capacity retention rate during | Thermal propagation time/ second (s) |
| Example 19 | Separator 19 | 15.0 | 1.0% | 84:10:1:3:2 | 86.5% | 515 |
| Example 20 | Separator 20 | 15.0 | 3.0% | 82:10:3:3:2 | 87.0% | 525 |
| Example 21 | Separator 21 | 15.0 | 5.0% | 80:10:5:3:2 | 89.2% | 551 |
| Example 22 | Separator 22 | 15.0 | 8.0% | 77:10:8:3:2 | 86.6% | 494 |
| Example 23 | Separator 23 | 15.0 | 10.0% | 75:10:10:3:2 | 86.0% | 421 |
| Example 24 | Separator 24 | 15.0 | 15.0% | 70:10:15:3:2 | 82.1% | 330 |
| Example 25 | Separator 25 | 10.0 | 5.0% | 80:10:5:3:2 | 87.1% | 520 |
| Example 26 | Separator 26 | 12.0 | 5.0% | 80:10:5:3:2 | 88.0% | 530 |
| Example 27 | Separator 27 | 13.5 | 5.0% | 80:10:5:3:2 | 88.2% | 536 |
| Example 28 | Separator 28 | 16.5 | 5.0% | 80:10:5:3:2 | 89.5% | 553 |
| Example 29 | Separator 29 | 18.0 | 5.0% | 80:10:5:3:2 | 89.2% | 513 |
| Example 30 | Separator 30 | 20.2 | 5.0% | 80:10:5:3:2 | 86.9% | 494 |
| Example 31 | Separator 31 | 22.0 | 5.0% | 80:10:5:3:2 | 85.2% | 405 |
| Example 32 | Separator 32 | 23.0 | 5.0% | 80:10:5:3:2 | 84.9% | 391 |
| Example 33 | Separator 33 | 27.0 | 5.0% | 80:10:5:3:2 | 80.2% | 331 |
| Example 34 | Separator 34 | 15.0 | 5.0% | 80:10:5:3:2 | 86.4% | 515 |
| Example 35 | Separator 35 | 15.0 | 5.0% | 80:10:5:3:2 | 87.0% | 521 |

It can be seen from Table 1 that, due to the use of first organic particles having a specific number-average particle size and particle morphology, the cycling performance and safety performance of the battery can be significantly improved. Especially, with further optimization of the number-average particle size, added amount or material type of the first organic particles, the cycling performance and safety performance of the battery can be further improved. In contrast, for comparative examples 1 and 2 where first organic particles having a number-average particle size outside the range defined in the present application are used, the cycling performance and the safety performance are both worse than those of examples 1-18 according to the present application; in comparative example 4 where first organic particles having a secondary particle morphology and a number-average particle size outside the range defined in the present application, the performance of the resulting battery is apparently worse than that of examples 1-18 according to the present application; In comparative example 3, the first organic particles used have a number-average particle size within the range defined in the present invention, but have a secondary particle morphology, and therefore the cycling performance and safety performance of the resulting battery are slightly better than those of comparative examples 1, 2 and 4, but to an extent not as high as in examples 1-18 according to the present application.

It can be seen from FIG. 2 that, by further adding second organic particles of a specific type having a specific number-average particle size and in a specific amount, the safety performance and cycling performance of the resulting battery can be further improved.

The present inventors also did experiments by using the inorganic particles, the first organic particles and the second organic particles falling within the range of the present application, but in other amounts and with other materials, other substrates, other coating process parameters and other process conditions, and obtained similar improvements in terms of cycling performance and safety performance of the batteries to those in examples 1-35.

Described above are merely specific embodiments of the present application, and the scope of protection of the present application is not limited thereto; any equivalent modification or replacement can be readily conceived by a person skilled in the art according to the technical range of the disclosure of the present application, and shall fall within the protection scope of the present application. Therefore, the scope of protection of the present application shall be determined by the claims.

What is claimed is:

1. A separator, comprising:
    a substrate; and
    a coating formed on at least one surface of the substrate, wherein
    the coating comprises inorganic particles and first organic particles embedded in the inorganic particles and forming protrusions on a surface of the coating;
    the first organic particles have a primary particle morphology and a number-average particle size of 2 μm to 10 μm; and
    the first organic particles comprise a copolymer selected from one or more of a butyl methacrylate-isooctyl methacrylate copolymer, an isooctyl methacrylate-styrene copolymer, a methacrylate-methacrylic acid-styrene copolymer, a methyl acrylate-isooctyl methacrylate-styrene copolymer, a butyl acrylate-isooctyl acrylate-styrene copolymer, a butyl acrylate-isooctyl methacrylate-styrene copolymer, a butyl methacrylate-isooctyl methacrylate-styrene copolymer, a butyl methacrylate-isooctyl acrylate-styrene copolymer, an isooctyl methacrylate-styrene-acrylonitrile copolymer, and a styrene-vinyl acetate-pyrrolidone copolymer.

2. The separator according to claim 1, wherein the first organic particles have a number-average particle size of 2 μm-8 μm.

3. The separator according to claim 1, wherein at least part of the first organic particles comprise a core structure and a shell structure.

4. The separator according to claim 1, wherein the coating further comprises second organic particles embedded in the inorganic particles and forming protrusions on the surface of the coating, the second organic particles have a secondary particle morphology and a number-average particle size of ≥12 μm.

5. The separator according to claim 3, wherein the shell structure has a glass transition temperature higher than that of the core structure;
the core structure has a glass transition temperature of −30° C.-20° C.; or
the shell structure has a glass transition temperature of 50° C. to 70° C.

6. The separator according to claim 1, wherein a mass percentage of the first organic particles in the coating is 10% to 30%.

7. The separator according to claim 1, wherein the first organic particles and the inorganic particles are formed from the same coating slurry;
a substantial portion of the first organic particles is concentrated on a top portion of the coating without touching a surface of the substrate; and
a substantial portion of the inorganic particles is concentrated on a bottom portion of the coating close to the substrate.

8. The separator according to claim 4, the second organic particles have a number-average particle size of 15 μm-25 μm.

9. The separator according to claim 4, wherein a mass percentage of the second organic particles in the coating is less than or equal to that of the first organic particles in the coating; or
a mass percentage of the second organic particles in the coating is 1%-10%.

10. The separator according to claim 4, wherein the second organic particles comprise one or more of a homopolymer or copolymer of a fluorine-containing olefine monomeric unit, a homopolymer or copolymer of an olefine monomeric unit, a homopolymer or copolymer of an unsaturated nitrile monomeric unit, a homopolymer or copolymer of an alkylene oxide monomeric unit, and modified compounds of these homopolymers or copolymers.

11. The separator according to claim 1, wherein the inorganic particles comprise one or more of boehmite (γ-AlOOH), aluminum oxide ($Al_2O_3$), barium sulfate ($BaSO_4$), magnesium oxide (MgO), magnesium hydroxide ($Mg(OH)_2$), silicon dioxide ($SiO_2$), tin dioxide ($SnO_2$), titanium oxide ($TiO_2$), calcium oxide (CaO), zinc oxide (ZnO), zirconium oxide ($ZrO_2$), yttrium oxide ($Y_2O_3$), nickel oxide (NiO), cerium oxide ($CeO_2$), zirconium titanate ($SrTiO_3$), barium titanate ($BaTiO_3$), and magnesium fluoride ($MgF_2$); and/or
the inorganic particles have a volume-average particle size of ≤2.5 μm.

12. The separator according to claim 1, wherein the separator has a single-sided coating weight per unit area of ≤3.0 g/m².

13. The separator according to claim 1, wherein the separator further satisfies one or more of the following (1)-(5):
(1) the separator has an air permeability of 100 s/100 mL-300 s/100 mL;
(2) the separator has a transverse elongation at break of 50%-200%;
(3) the separator has a longitudinal elongation at break of 50%-200%;
(4) the separator has a transverse tensile strength (TD) of 1000 kgf/cm²-3500 kgf/cm²; and
(5) the separator has a longitudinal tensile strength (MD) of 1000 kgf/cm²-3500 kgf/cm².

14. The separator according to claim 1, wherein the inorganic particles and the organic particles form a non-uniform pore structure in the coating, optionally a spacing between any two adjacent inorganic particles is denoted as L1, and a spacing between any inorganic particle and an adjacent organic particle is denoted as L2, with L1<L2.

15. A method for preparing a separator of claim 1, comprising the steps of:
(1) providing a substrate;
(2) providing a coating slurry comprising a component material and a solvent, wherein the component material comprises inorganic particles and organic particles, and the organic particles comprise first organic particles; and
(3) coating at least one side of the substrate from step (1) with the coating slurry from step (2) so as to form a coating on at least one surface of the substrate, and drying the substrate and the coating to obtain the separator;
wherein the coating comprises inorganic particles and first organic particles embedded in the inorganic particles and forming protrusions on the surface of the coating; and the first organic particles have a primary particle morphology and a number-average particle size of 2 μm to 10 μm, the first organic particles comprise a copolymer selected from one or more of a butyl methacrylate-isooctyl methacrylate copolymer, an isooctyl methacrylate-styrene copolymer, a methacrylate-methacrylic acid-styrene copolymer, a methyl acrylate-isooctyl methacrylate-styrene copolymer, a butyl acrylate-isooctyl acrylate-styrene copolymer, a butyl acrylate-isooctyl methacrylate-styrene copolymer, a butyl methacrylate-isooctyl methacrylate-styrene copolymer, a butyl methacrylate-isooctyl acrylate-styrene copolymer, an isooctyl methacrylate-styrene-acrylonitrile copolymer, and a styrene-vinyl acetate-pyrrolidone copolymer.

16. The method according to claim 15, wherein in step (2), the organic particles further comprise second organic particles and the second organic particles have a secondary particle morphology.

17. The method according to claim 16, wherein the second organic particles are added in a mass less than or equal to that of the first organic particles;
the second organic particles are added in a mass percentage of 1%-10% of the total dry weight of the component material.

18. The method according to claim 15, wherein the method satisfies one or more of the following (1)-(7):
(1) in step (2), the first organic particles are added in a mass percentage of 10% or more of the total dry weight of the component material;

(2) in step (2), the coating slurry has a solid content of 28%-45%;
(3) in step (3), the coating is carried out using a coating machine, which comprises a gravure roller having a number of lines of 100LPI-300LPI;
(4) in step (3), the coating is carried out at a speed of 30 m/min-90 m/min;
(5) in step (3), the coating is carried out at a line speed ratio of 0.8-2.5;
(6) in step (3), the drying is carried out at a temperature of 40° C. to 70° C.; and
(7) in step (3), the drying is carried out for a period of 10 s-120 s.

19. A secondary battery, comprising a separator according to claim 1.

20. The separator according to claim 1, wherein the first organic particles comprise one or more selected from a butyl methacrylate-isooctyl methacrylate-styrene copolymer and a styrene-vinyl acetate-pyrrolidone copolymer.

\* \* \* \* \*